United States Patent
Aoyagi et al.

(10) Patent No.: US 9,709,209 B2
(45) Date of Patent: Jul. 18, 2017

(54) LOAD SUPPORT MECHANISM

(71) Applicants: Tatsuzo Aoyagi, Yamanashi-ken (JP); Hiroto Akiyama, Yamanashi-ken (JP); Toru Ochiai, Yamanashi-ken (JP); Masayuki Yamamoto, Yamanashi-ken (JP); Toshiki Ono, Yamanashi-ken (JP)

(72) Inventors: Tatsuzo Aoyagi, Yamanashi-ken (JP); Hiroto Akiyama, Yamanashi-ken (JP); Toru Ochiai, Yamanashi-ken (JP); Masayuki Yamamoto, Yamanashi-ken (JP); Toshiki Ono, Yamanashi-ken (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 104 days.

(21) Appl. No.: 14/511,935

(22) Filed: Oct. 10, 2014

(65) Prior Publication Data

US 2015/0102201 A1 Apr. 16, 2015

(30) Foreign Application Priority Data

Oct. 11, 2013 (JP) .................. 2013-214253
Oct. 11, 2013 (JP) .................. 2013-214256
Oct. 11, 2013 (JP) .................. 2013-214258

(51) Int. Cl.
*F16M 11/18* (2006.01)
*F16M 11/04* (2006.01)
*B66F 3/10* (2006.01)

(52) U.S. Cl.
CPC ........... *F16M 11/18* (2013.01); *F16M 11/046* (2013.01); *B66F 3/10* (2013.01); *F16M 2200/047* (2013.01)

(58) Field of Classification Search
CPC ...... B66F 3/10; B66F 3/00; B66F 3/16; B66F 2700/00; B66F 19/00; F16M 11/18; F16M 11/046; F16M 2200/047; Y10T 74/18672

(Continued)

(56) References Cited

U.S. PATENT DOCUMENTS 1,862,759 A * 6/1932 Morrison ................. B66F 3/10
  254/102
2,623,573 A * 12/1952 Di Gaetano ............. B62J 1/06
  280/283

(Continued)

FOREIGN PATENT DOCUMENTS

JP  2002-303304 A  10/2002

*Primary Examiner* — Nkeisha Smith
(74) *Attorney, Agent, or Firm* — Manabu Kanesaka

(57) ABSTRACT

To achieve a mechanism that supports an article at a desired position in a displaceable manner in accordance with a weight of the article with a simple, small, and lightweight structure.

An article supporting device 1 includes a base member 2, a supporting member 3, a spring member 4 which is a compression coil spring, a spring force transmission member 5, a cam member 6, and a cam follower member 7. The cam follower member is pressed against a downward-facing cam surface 15 of the support member, an upward-facing cam surface 18 of the spring force transmission member, and a sideward-facing cam surface 22 of the cam member by a load of an article and a spring force of the spring member. The downward-facing cam surface and upward-facing cam surface are inclined in reverse directions to each other and disposed opposite to each other with the cam follower member interposed therebetween. A pressing force of the sideward-facing cam surface against the cam follower member includes a vertical direction component depending on a height position of the supporting member. The downward-facing cam surface, upward-facing cam surface, and sideward-facing cam surface are designed such that, in a moving range of the support member, the load, spring force, and pressing forces of the respective cam surfaces against the cam follower member are in equilibrium about the cam follower member.

8 Claims, 14 Drawing Sheets

(58) Field of Classification Search
USPC ...... 248/157, 420, 423, 354.5, 354.6, 354.1,
248/121, 122.1, 125.1, 125.8, 161, 615
See application file for complete search history.

(56) References Cited

U.S. PATENT DOCUMENTS

| | | | | |
|---|---|---|---|---|
| 3,367,689 A * | 2/1968 | McCarthy | ............... | E04G 25/06 248/354.6 |
| 3,802,658 A * | 4/1974 | Binding | ................... | B66F 1/04 248/352 |
| 3,870,278 A * | 3/1975 | Lee | .......................... | B66F 3/14 248/354.3 |
| 5,011,174 A * | 4/1991 | Ross-Clunis | .......... | B62K 19/36 248/161 |
| 6,026,755 A * | 2/2000 | Long | ....................... | A47B 9/02 108/147 |
| 6,042,065 A * | 3/2000 | Benjamin | ................ | D05C 1/00 248/125.1 |
| 7,690,618 B2 * | 4/2010 | Halstead | ............. | A47B 91/024 188/265 |
| 8,047,479 B2 * | 11/2011 | Liu | ....................... | F16M 11/04 248/157 |

\* cited by examiner ically larger than weights of the movable body and monitor device is required as the energy storage member. In addition, the coil spring is disposed to the front and/or rear

LOAD SUPPORT MECHANISM

BACKGROUND OF THE INVENTION

Field of the Invention

The present invention relates to a supporting mechanism for supporting a load of various articles and the like and, more particularly, to a load supporting mechanism that supports a target article at a desirable position in a displaceable manner.

Description of the Related Art

There have been proposed various types of supporting mechanism for the purpose of supporting an article, such as a monitor device of a computer or a TV, a top plate of an OA desk or a working table, a heavy article, or the like, at a desirable height position in an elevating/lowering manner. For example, there is known a monitor device supporting mechanism capable of vertically moving a monitor device and positioning the same with a fixed supporting force (for example, see Patent Document 1 [Jpn. Pat. Appln. Laid-Open Publication No. 2002-303304]).

The monitor device supporting mechanism described in Patent Document 1 has at least one cam, at least one cam follower member, an energy storage member, and a movable body to which the monitor device is mounted. In the monitor device supporting mechanism, when the movable body is moved along a fixed base, a spring is compressed/extended to increase/decrease elastic energy stored in the spring. A spring force of the spring is converted into a reaction force against the cam follower member from a cam surface. The reaction force includes a first component directed in a moving direction of the movable body and a second component directed in a direction substantially perpendicular to the first component. A shape of the cam is designed such that even if the second component is increased/decreased by the compression/extension of the spring, the first component directed to its moving direction is maintained so as to allow a substantially constant supporting force to act on the movable body and monitor device.

According to Patent Document 1, a force that biases the movable object and monitor device which are being moved in their moving direction can be maintained substantially constant by a combination of such a spring and cam shape. Thus, when a slight force is applied by a hand to the movable body or monitor device, the monitor device can be easily moved and, when the force is released, the movable body and monitor device are fixedly located to their new supporting position.

Preferably, in terms of practical use, the article supporting mechanism of a type described above is simple in structure, reduced in the number of components, and reduced in size and weight. However, in the monitor device supporting mechanism described in Patent Document 1, the coil spring serving as the energy storage member is disposed such that an axial direction thereof is substantially perpendicular to the moving direction of the monitor device, and the spring force of the coil spring is used to press the cam follower member positioned at a leading end of an arm member rotatably mounted to the movable body against the cam surface. Not all the reaction force against the cam follower from the cam surface, but only the first component directed in the moving direction of the movable body serves as the force for supporting the monitor device.

Thus, a large spring capable of exhibiting a spring force considerably larger than weights of the movable body and monitor device is required as the energy storage member. In addition, the coil spring is disposed to the front and/or rear of the cam. Consequently, a size of the entire mechanism is enlarged in, especially, a depth direction, and a structure thereof is complicated, making it difficult to achieve a reduction in size and weight.

Further, in the monitor device supporting mechanism described in Patent Document 1, the supporting force for the monitor device is determined by a combination of the spring and cam shape, so that when the monitor device to be supported is changed to one having a different weight, it is necessary to exchange the spring and cam shape or the supporting mechanism itself. Accordingly, it is necessary to prepare a supporting mechanism or a component in accordance with the weight of an article to be supported, thus disadvantageously increasing cost.

SUMMARY OF THE INVENTION

The present invention has been made in view of the above problems, and an object thereof is to provide a load supporting mechanism that is capable of supporting a load such as an article or the like at a desirable position in a displaceable manner and is simple in structure, reduced in the number of components, and easy in miniaturization.

A load supporting mechanism according to the present invention includes: a supporting member for supporting a load, capable of being moved within a predetermined range along a predetermined direction; a spring member whose one end is fixed and the other end applies a biasing force to the supporting member against the load in a direction along a moving direction of the supporting member; a cam follower; a first cam surface that abuts against the cam follower to transmit the load to the spring member side and that is inclined with respect to the biasing force direction; a second cam surface that abuts against the cam follower to transmit the biasing force to the supporting member side and that is inclined with respect to the biasing force direction; a third cam surface that abuts against the cam follower and is inclined with respect to the biasing force direction; a first side supporting portion that generates, at the first cam surface, a reaction force against the load that restricts a displacement of the first cam surface in a direction perpendicular to the biasing force direction; and a second side supporting portion that generates, at the second cam surface, a reaction force against the biasing force that restricts a displacement of the second cam surface in the direction perpendicular to the biasing force direction. A pressing force of the third cam surface against the cam follower includes a first direction component along the direction of the biasing force generated depending on a position in the predetermined range over which the supporting member can be moved and a second direction component perpendicular to at least the biasing force direction. The first cam surface, second cam surface, and third cam surface are designed such that in the predetermined range over which the supporting member can be moved, the load, biasing force of the spring member, pressing force of the third cam surface against the cam follower, a reaction force of the first side supporting portion against the first cam surface, and a reaction force of the second side supporting portion against the second cam surface are in equilibrium about the cam follower.

Throughout the present specification, the term "equilibrium" refers to a state in which when some external forces are applied to a given article or a member (e.g., cam follower), a sum of the external forces is 0 and, consequently, the article or member is in a stationary state. The external forces to be applied to the article or member include a friction force generated between the article or member and another article or member and a friction force generated between another article or member that applies the external force to the article or member.

With the configuration as described above, pressing forces from the respective first cam surface and second cam surface each include a first direction component along the biasing force direction and a second direction component perpendicular to the first direction component. The second direction components are a reaction force of the first side supporting portion against the first cam surface and a reaction force of the second side supporting portion against the second cam surface. Thus, when the forces applied about the cam follower are in equilibrium, the load, biasing force of the spring member, and first direction component of the pressing force of the third cam surface against the cam follower are in equilibrium in the biasing force direction, and a reaction of the first side supporting portion against the first cam surface, i.e., the second direction component of the pressing force of the first cam surface against the cam follower, a reaction of the second side supporting portion against the second cam surface, i.e., the second direction component of the pressing force of the second cam surface against the cam follower, and second direction component of the pressing force of the third cam surface against the cam follower are in equilibrium in a direction perpendicular to the biasing force direction.

In general, the biasing force of the spring member changes with a displacement of the spring member and thus becomes smaller or larger than the load depending on a position of the supporting member. According to the present invention, in a state where the forces are in equilibrium in the biasing force direction, the first direction component of the pressing force of the third cam surface against the cam follower acts in a direction assisting the biasing force of the spring member when the biasing force is smaller than the load, while acts in a direction reducing the biasing force of the spring member when the biasing force is larger than the load. Therefore, in the predetermined range over which the supporting member can be moved, it is possible to retain the supporting member at a desired position in a state where the load is supported and to easily move the supporting member with a small force.

Further, the larger a force with which the cam follower presses the third cam surface in the horizontal direction, the larger the pressing force of the third cam surface against the cam follower. According to the present invention, by pressing the cam follower with the first and second cam surfaces, it is possible to easily increase the pressing force pressing the third cam surface in the horizontal direction. When the pressing force of the third cam surface against the cam follower is increased, the first direction component thereof is also increased, so that even when an inclination of the third cam surface with respect to the biasing force direction is reduced, the force assisting or reducing the biasing force of the spring member can be maintained at the same level.

When the third cam surface is reduced in inclination with respect to the biasing direction, it can correspondingly be reduced in dimension in a direction perpendicular to the biasing force direction as a whole. As a result, a size of the entire device can be reduced particularly in the direction perpendicular to the biasing force direction.

Further, the spring member need not exhibit a biasing force having a magnitude exceeding the load in the entire moving region of the supporting member. Thus, it is possible to adopt a comparatively small and lightweight supporting member, thereby reducing a size and a weight of the entire device.

In an embodiment, in the predetermined range over which the supporting member can be moved, the third cam surface has a first region in which the first direction component of a pressing force of the third cam surface against the cam follower acts on the biasing force direction and a second region in which the first direction component of the pressing force of the third cam surface against the cam follower acts on a direction reverse to the biasing force direction.

With this configuration, a magnitude of the inclination of the third cam surface with respect to the biasing force direction is not excessively increased or reduced in the first region or second region, so that it is possible to form the third cam surface into a convex shape that protrudes comparatively gently protruding in a direction perpendicular to the biasing force direction. As a result, the third cam surface can be reduced further in dimension in the direction perpendicular to the biasing force direction, whereby further miniaturization of the entire device can be achieved. Further, when the supporting member is moved to a desired position, the cam follower can be smoothly moved along and over the entire third cam surface.

In another embodiment, the load supporting device further includes a fixed member that fixes thereto the one end of the spring member and that has the first and second side supporting portions. This can simplify a configuration of the entire device and reduce the number of components.

In still another embodiment, the supporting member is configured to be movable with respect to the fixed member, and a means for reducing a resistance generated upon movement of the supporting member is provided between the supporting member and fixed member. By providing such a resistance reducing means, it is possible to eliminate or reduce influence that the resistance may have, in actual use, on the operations and functions of the present invention for retaining the supporting member at a desired position, thereby ensuring smooth movement of the supporting member with respect to the fixed member.

In still another embodiment, the first cam surface and second cam surface are inclined in reverse directions to each other and disposed opposite to each other with the cam follower interposed therebetween. With this configuration, it is possible to press the cam follower from the first and second cam surface with a larger force.

DESCRIPTION OF THE PREFERRED EMBODIMENTS

Figure 1:
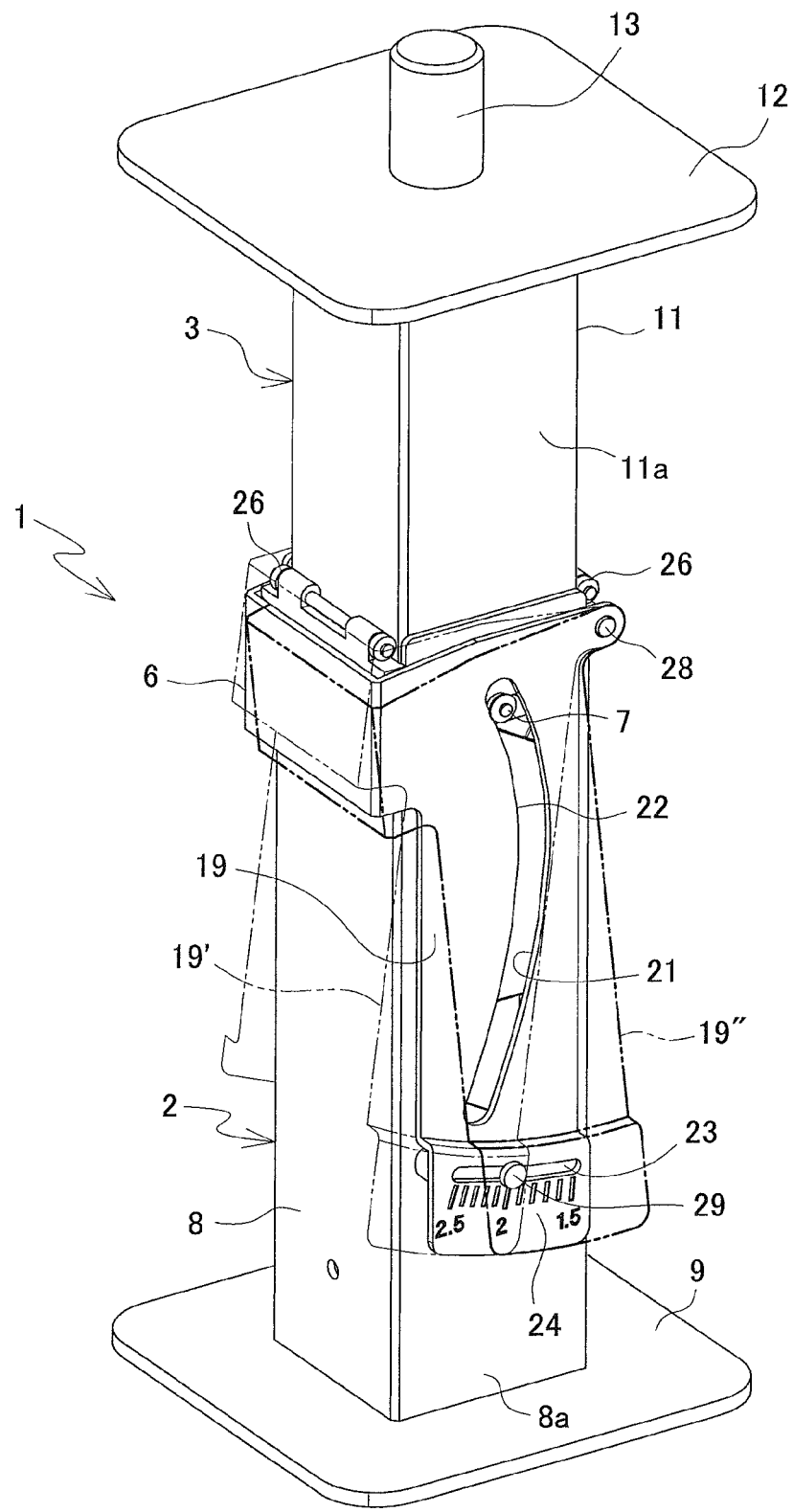
FIG. 1 is a perspective view of an embodiment of a load supporting mechanism according to the present invention.

Preferred embodiments of the present invention will be described in detail below with reference to the accompanying drawings. Throughout the accompanying drawings, the same reference numerals are used to designate the same or similar components.

Figure 2:
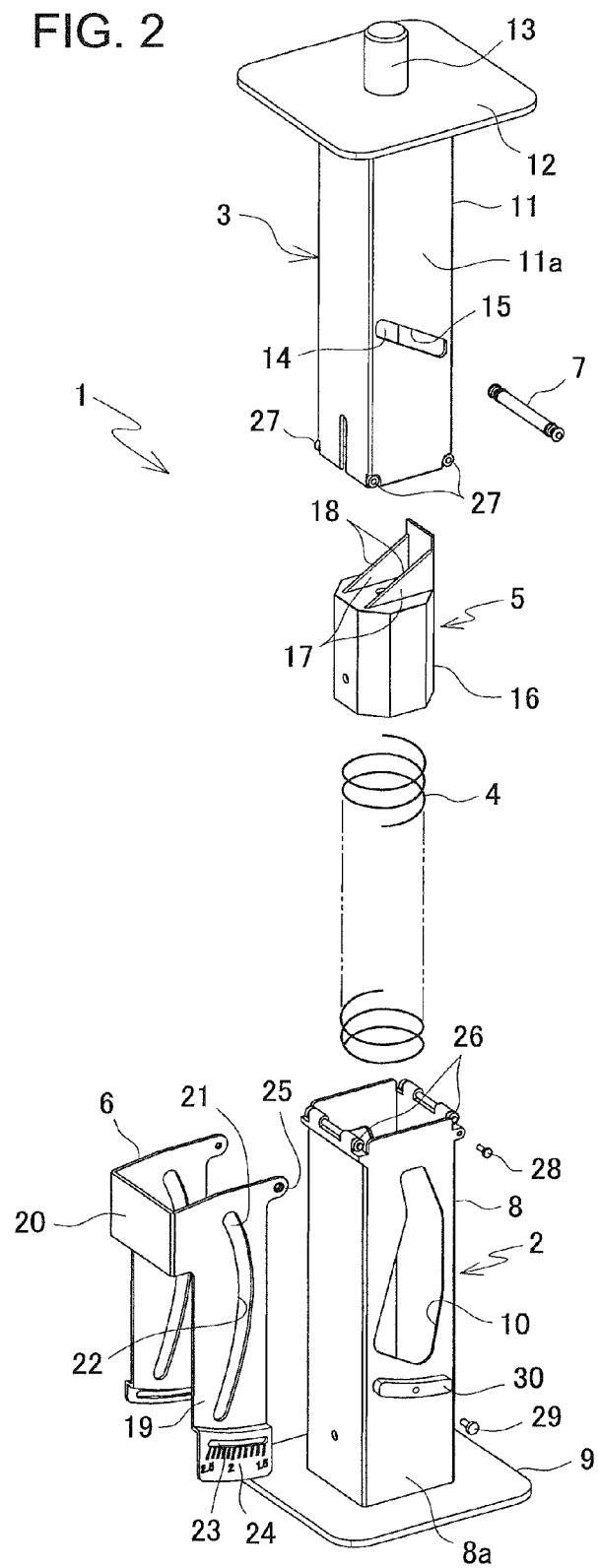
FIG. 2 is an exploded perspective view of the present embodiment.

FIGS. 1 and 2 each schematically illustrate an article supporting device 1 which is a preferred embodiment (first embodiment) of the load supporting mechanism according to the present invention. As illustrated in FIGS. 1 and 2, the article supporting device 1 includes a base member 2, a supporting member 3, a spring member 4 as a compression coil spring, a spring force transmission member 5, a cam member 6, and a cam follower member 7.

The base member 2 includes a rectangular tubular fixed column 8 and a base plate 9. The fixed column 8 extends vertically and opens upward. The base plate 9 is formed integrally with and at a lower end of the fixed column 8 for installation of the article supporting device 1 on a floor surface or a working table surface. In a pair of opposing side surfaces 8a of the fixed column 8, a pair of comparatively large opening portions 10 each extending in a longitudinal direction of the fixed column 8 are formed respectively so as to be opposed to each other.

The supporting member 3 includes a rectangular tubular movable column 11 and a mounting plate 12. The movable column 11 extends vertically and opens downward. The mounting plate 12 is formed integrally with and at an upper end of the movable column 11 for mounting of a desired article thereon. A positioning pin 13 for positioning of the article protrudes from a center of an upper surface of the mounting plate 12. In a pair of opposing side surfaces 11a of the movable column 11, a pair of first cam grooves 14 having the same shape and dimension and each extending, obliquely with respect to a longitudinal direction of the movable column 11, over substantially the entire width of the movable column are formed respectively so as to be opposed to each other. Each first cam groove 14 has a downward-facing cam surface 15 which is an end face on an upper side of an inner periphery of the first cam groove 14. The downward-facing cam surface 15 is linearly inclined at a predetermined angle with respect to a center axis of the movable column 11.

The spring force transmission member 5 includes a short octagonal tubular slide portion 16 and a pair of cams 17. The slide portion 16 extends vertically and opens downward. The pair of cams 17 have the same shape and dimension and are each formed integrally with and at an upper end of the slide portion. The cams 17 are flat plate cams which are arranged in parallel to each other and to a given pair of opposing side surfaces 16a of the slide portion 16 and arranged in mirror symmetry with respect to a center axis of the slide portion. Each cam 17 has an upward-facing cam surface 18 which is an upper end face of the cam 17. The upward-facing cam surface 18 extends over substantially the entire width of the slide portion 16 and is linearly inclined at a predetermined angle with respect to a center axis of the slide portion.

Figure 3:
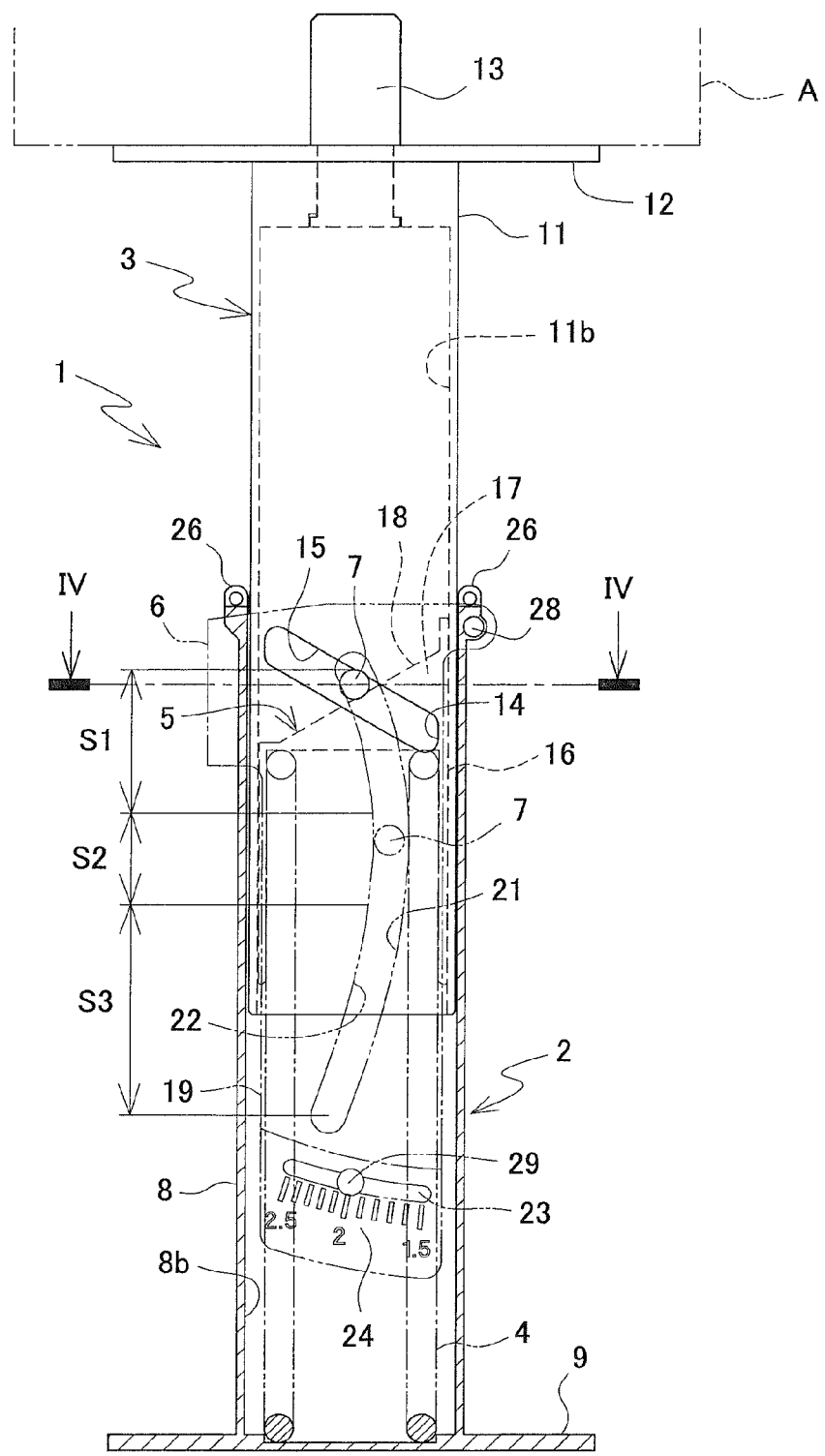
FIG. 3 is a vertical cross-sectional view of the present embodiment in which a mounting plate is situated at an uppermost position in a standard mode.
Figure 4:
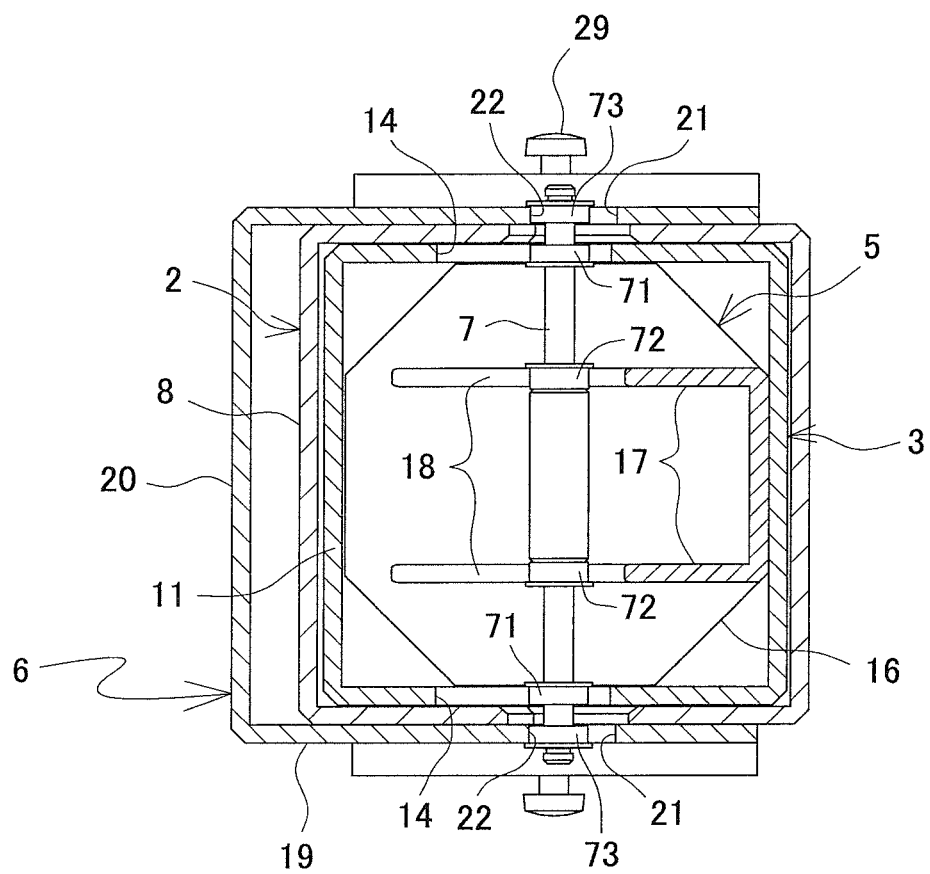
FIG. 4 is a cross-sectional view taken along a line IV-IV of FIG. 3.

As illustrated in FIGS. 3 and 4, the spring force transmission member 5 is inserted into an inner hole 11b of the movable column 11 of the supporting member 3, with some of (four) outside surfaces of the slide portion 16 in slide contact with their corresponding inner surfaces of the inner hole 11b, so as to be relatively slidable in the vertical direction. The spring force transmission member 5 is disposed such that each cam 17 and its corresponding first cam groove 14 of the movable column are located on the same side. At this time, the downward-facing cam surface 15 and upward-facing cam surface 18 are disposed so as to be opposed to each other such that inclination directions thereof are inverted each other.

The cam member 6 includes a pair of cam plates 19 having the same shape and dimension and disposed in parallel and opposite to each other with a predetermined interval therebetween. The cam plates 19 are integrally formed, through a connecting plate 20 located at an upper side edge on one side thereof, in a U-like shape as viewed from above. Second cam grooves 21 are formed in the cam plates 19, respectively, so as to be opposed to each other. The second cam grooves 21 have the same shape and dimension and each extend in the vertical direction. The second cam groove 21 has a sideward-facing cam surface 22 which is an end face of an inner periphery thereof on a left side of FIG. 3, that is, the end face on a side facing the upward-facing cam surface 18 and downward-facing cam surface 15. The sideward-facing cam surface 22 is curved in a convex shape to the right in the figure, i.e., toward the upward-facing cam surface 18 and downward-facing cam surface 15 such that inclination in a tangential direction changes over the entire length from an upper end thereof to a lower end or partially.

At a lower end of each cam plate 19, a cam position adjustment groove 23 having an arc shape protruding downward and extending in a width direction of the cam plate 19 is formed, and a scale 24 is provided along and on a lower side of the cam position adjustment groove 23. Further, a shaft hole 25 for pivotably supporting the cam member 6 is formed at an upper end of a side edge of each cam plate 19 on an opposite side to the connecting plate 20.

The cam follower member 7 is a straight circular rod formed of, e.g., metal, and a plurality of rolling bearings having the same outer diameter are fitted around an outer periphery thereof along an axial line direction of the rod. Thus, as described later, the cam follower member 7 can smoothly roll with the bearings abutting against the upward-facing cam surface 18, the downward-facing cam surface 15 and sideward-facing cam surface 22. In another embodiment, the bearings can be omitted.

The spring member 4 is disposed in an inner hole 8b of the fixed column 8 of the base member 2 and is fixed therein with a lower end thereof abutting against a bottom surface of the inner hole. The movable column 11 in which the spring force transmission member 5 is fitted inside the inner hole 11b is inserted inside the inner hole 8b of the fixed column 8 so as to be relatively movable in the vertical direction. In this state, the spring force transmission member 5 is mounted on an upper end of the spring member 4 so as to be biased upward with the upper end abutting against an upper end surface of an inner hole 15a of the slide portion 16.

A pair of left and right guide rollers 26 are provided on an upper end of the fixed column 8 so as to abut against a pair of opposing side surfaces perpendicular to the side surface 11a of the movable column 11 each in which the first cam groove 14 is formed. Further, guide rollers 27 are provided at corner portions of a lower end of the movable column 11 so as to abut against inner surfaces of the inner hole 8b of the fixed column 8 that adjoin the side surfaces, respectively. The movable column 11 is supported from both the left and right sides by the fixed column 8 through the guide rollers 26 and 27 and thus can smoothly be moved in the vertical direction without rattling or being displaced in a lateral direction with respect to the fixed column.

As illustrated in FIG. 2, the cam member 6 is mounted to the fixed column 8 as follows: the cam plates 19 are made to cover/overlap, from the side, the side surfaces 8a of the fixed column each in which the opening portion 10 is formed, and then pivot pins 28 are inserted through the shaft holes 25 respectively, and screwed into screw holes formed at the upper end of the fixed column 8. As a result, as indicated by an imaginary line, the cam member 6 is retained so as to be pivotable about the pivot pins. Further, a positioning screw 29 is inserted through the cam position adjustment groove 23 of the cam member 6 from outside and screwed into a cam plate fixing portion 30 formed at the back of the cam position adjustment groove 23 so as to protrude from the side surface 8a of the fixed column 8. By fastening the positioning screws 29, the cam member 6, i.e., cam plates 19 are fixed to the fixed column 8 at a desired rotation position.

In the present embodiment, three numbers: "1.5", "2", and "2.5" are marked on the scale 24 provided below the cam position adjustment groove 23, which indicates that a load of an article that can be placed on the article supporting device 1 is in a range of 1.5 kg to 2.5 kg. In an example of FIG. 3, the positioning screw 29 is positioned to "2" of the scale 24, which means that an article with a load of 2 kg should be supported. When an article with a load of 1.5 kg is supported, the cam plate 19 is fixed to a position indicated by an imaginary line 19' of FIG. 1, and an article with a load of 2.5 kg is supported, the cam plate is fixed to a position indicated by an imaginary line 19" of FIG. 1.

The cam follower member 7 is inserted through the first cam groove 14, second cam groove 21, and opening portion 10 of the fixed column 8 to be horizontally disposed on the cam 17. In this state, an outer peripheral surface of the cam follower member 7 abuts against the downward-facing cam surface 15, upward-facing cam surface 18, and sideward-facing cam surface 22, and the rolling bearings fitted around the rod of the cam follower member 7 abut against corresponding cam surfaces 22 (that is, rolling bearings 71 abut against the downward-facing cam surface 15, rolling bearings 72 abut against the upward-facing cam surface 18, and rolling bearings 73 abut against the sideward-facing cam surface 22). Preferably, an adequate retaining ring is fitted to both ends of the cam follower member 7 protruding outside of the cam plate 19 from the second cam groove 21 for coming-off prevention.

In the present embodiment, a vertical moving range of the cam follower member 7 in the second cam groove 21 corresponds to a vertical stroke of the supporting member 3, i.e., mounting plate 12. Within this range, an article A on the mounting plate 12 can be elevated/lowered and can be stopped and retained at a desirable height position.

The following describes the operation and function of the article supporting device 1. In the following description, a case where a load of an article to be supported by the article supporting device is 2 kg is referred to as a standard mode, a load of the article to be supported is 1.5 kg, which is the minimum load, is referred to as a lightweight mode, and a load of the article to be supported is 2.5 kg, which is the maximum load, is referred to as a heavyweight mode.

The sideward-facing cam surface 22 of the second cam groove 21 is divided into three regions: a first region S1, a second region S2, and a third region S3, depending on an abutment position against the cam follower member 7. The first region S1 is a region in which a normal direction at a contact point between the sideward-facing cam surface 22 and cam follower member 7 is directed upward with respect to the horizontal direction. The second region S2 is a region in which the normal direction at the contact point is directed substantially horizontally. In other words, the second region S2 is a region in which a tangential direction at the contact point is directed substantially vertically. The term "substantially horizontally" used here means that a case where the normal direction at the contact point is directed slightly upward or downward with respect to the complete horizontal direction can be regarded as the horizontal direction since a degree of misalignment with the horizontal direction is negligibly small in terms of the effects of the present invention, or operation or function of the article supporting device 1 according to the present embodiment. The third region S3 is a region in which the normal direction at the contact point is directed downward with respect to the horizontal direction.

FIG. 3 illustrates a case where the mounting plate 12 on which the article A with a load W is situated at an uppermost position in the standard mode. The cam follower member 7 is stopped at an upper limit position of the first region S1 of the sideward-facing cam surface 22.

Figure 5:
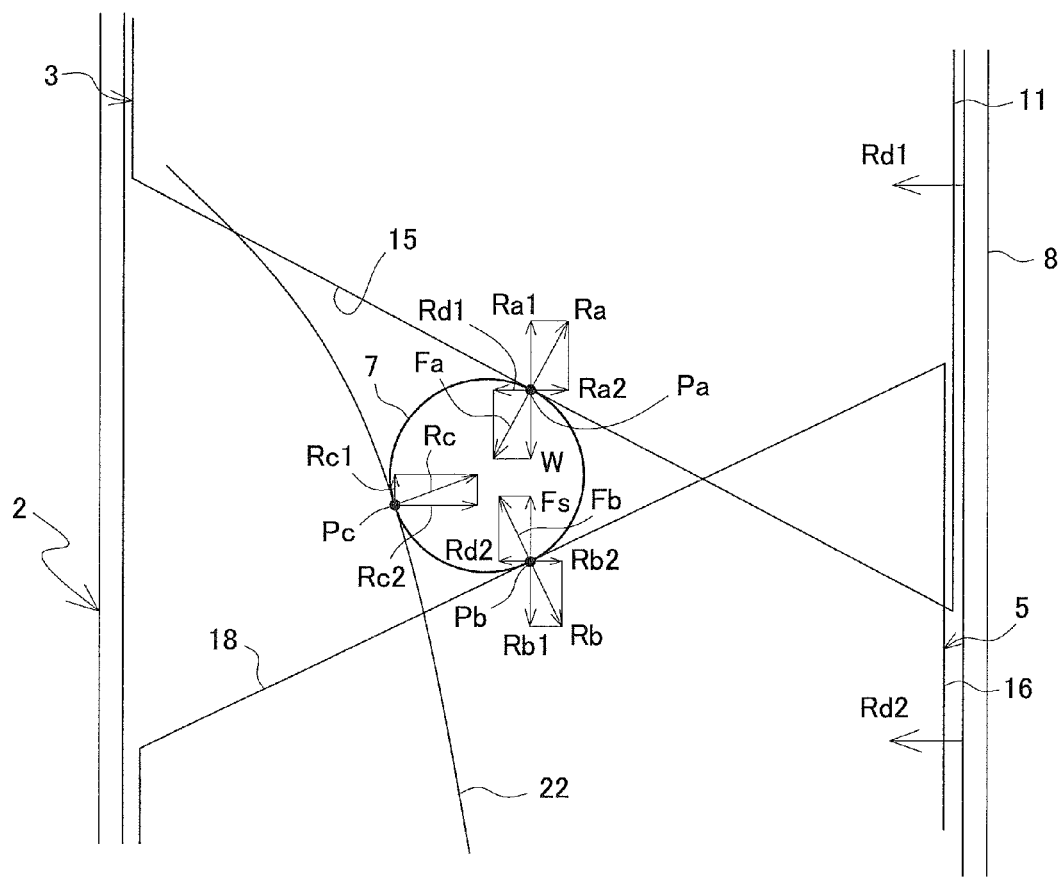
FIG. 5 is a schematic view for explaining a relationship among main components in the state illustrated in FIG. 3.

FIG. 5 schematically illustrates an equilibrium state between forces applied, at the upper limited position, to a system including the cam follower member 7, fixed column 8, movable column 11, spring force transmission member 5, and cam plates 19. For simplification, loads of the supporting member 3 and spring force transmission member 5 and a friction force among the movable column 11, fixed column 8, and spring force transmission member are omitted here. However, it goes without saying that these factors need to be taken into consideration in an actual design, and when a resultant force obtained by adding the loads of the supporting member and spring force transmission member to the forces applied to the system including the cam follower member, fixed column, movable column, spring force transmission member, and cam plates is smaller than the friction force generated among the movable column, fixed column, and spring force transmission member, the equilibrium state is maintained.

A spring force Fs of the spring member 4 which is a compression spring having a spring constant k is represented by $Fs = k \cdot x$, where x is a displacement (displacement from a free length of the spring, i.e., a length of the spring in an unloaded state, the displacement being positive in the compression direction) of the compression spring in an axial direction thereof. To allow the article A to be supported at the uppermost position, the compression spring is previously compressed by a predetermined initial displacement amount x0 from the free length at the upper limit position of the stroke so as to exhibit an initial spring force ($Fs0 = k \cdot x0$)

directed upward in the vertical direction. The same is applied to a case where a fixing position of the cam plates 19 is changed in accordance with a load to be supported.

In FIG. 5, at a contact point Pa between the cam follower member 7 and downward-facing cam surface 15, the load W of the article A, a reaction force Ra applied from the cam follower member 7 to the normal direction of the downward-facing cam surface 15, and a horizontal reaction force Rd1 applied from the fixed column 8 to movable column 11 are in equilibrium. A vertical direction component Ra1 of the reaction force Ra is equal in magnitude to the load W, and a horizontal direction component Ra2 of the reaction force Ra is equal in magnitude to the reaction force Rd1 from the fixed column 8. A force Fa with which the downward-facing cam surface 15 presses the cam follower member 7 is a resultant force of the load W and reaction force Rd1.

At a contact point Pb between the cam follower member 7 and upward-facing cam surface 18, the spring force Fs of the spring member 4, a reaction force Rb applied from the cam follower member 7 to the normal direction of the upward-facing cam surface 18, and a reaction force Rd2 horizontally applied from the fixed column 8 to spring force transmission member 5 through the movable column 11 are in equilibrium. A vertical direction component Rb1 of the reaction force Rb is equal in magnitude to the spring force Fs, and a horizontal direction component Rb2 of the reaction force Rb is equal in magnitude to the reaction force Rd2 of the fixed column 8. A force Fb with which the upward-facing cam surface 18 presses the cam follower member 7 is a resultant force of the spring force Fs and reaction force Rd2.

At a contact point Pc between the cam follower member and sideward-facing cam surface 22, forces Fa and Fb applied from the respective downward-facing cam surface 15 and upward-facing cam surface 18 to the cam follower member and a reaction force Rc applied in the normal direction from the sideward-facing cam surface 22 are in equilibrium. Since the cam follower member 7 is situated in the first region S1 of the sideward-facing cam surface 22, the reaction force Rc has a vertical direction component Rc1 directed upward. A magnitude of a horizontal direction component Rc2 of the reaction force Rc is a sum of the reaction forces Rd1 and Rd2 that the respective movable column 11 and spring force transmission member 5 receive from the fixed column 8.

When the cam follower member 7 is stopped at a given position on the sideward-facing cam surface 22, the following relationship is always theoretically satisfied among the load W, spring force Fs, and vertical direction component Rc1 of the reaction force Rc, assuming that a force acting direction is set upward in the vertical direction (force is positive vertically upward).

$W+Fs+Rc1=0$

In the actual design, even if the resultant force in the above relational expression is not 0 but has a minute value due to generation of the friction force between the members, when the resultant force is smaller than the friction force between the members, the equilibrium state is maintained.

In the case of FIG. 3, the spring force Fs of the spring member 4 is the minimum initial spring force ($Fs0=k \cdot x0$), which is smaller in magnitude than the load W. Then, by adding the upwardly-directed vertical direction component Rc1 of the reaction force Rc applied from the sideward-facing cam surface 22 to the spring force Fs as an assist force, an equilibrium state between the spring force Fs and load W in the vertical direction is achieved. In this state, when the article A or the mounting plate 12 is pushed down by a hand, the pushing-down force is added to the load W to break the equilibrium state, so that the article can easily be lowered with a comparatively small force.

When the mounting plate 12 is lowered, the cam follower member 7 is moved down while being displaced laterally along the sideward-facing cam surface, downward-facing cam surface, and upward-facing cam surface. While the cam follower member 7 is situated within the first region S1 of the sideward-facing cam surface 22, the upwardly-directed vertical direction component Rc1 of the reaction force Rc acts such that the spring force Fs is in equilibrium with the load W.

The spring force Fs of the spring member 4 is increased as a displacement amount of the compression spring is increased as a result of downward movement of the spring force transmission member 5 pressed by the cam follower member 7. With the increase in the spring force Fs, the vertical direction component Rc1 of the reaction force Rc from the sideward-facing cam surface 22 required as the assist force can be reduced in magnitude. Thus, the inclination of the tangential direction of the sideward-facing cam surface 22 with respect to the vertical direction is reduced toward the lower side of the sideward-facing cam surface 22.

The larger a force with which the cam follower member that receives a pressing force from the downward-facing cam surface 15 and upward-facing cam surface 18 presses the sideward-facing cam surface 22 in the horizontal direction, the larger the horizontal direction component Rc2 of the reaction force Rc becomes, and thus, the larger the reaction force Rc and vertical direction component Rc1 thereof. The reaction force Rd1 and reaction force Rd2 are increased when the inclinations of the downward-facing cam surface 15 and upward-facing cam surface 18 with respect to the vertical direction are reduced, respectively, while the forces Rd1 and Rd2 are reduced when the inclinations of the downward-facing cam surface 15 and upward-facing cam surface 18 with respect to the vertical direction are increased, respectively. By adjusting the inclinations of the downward-facing cam surface 15 and upward-facing cam surface 18 with respect to the vertical direction, it is possible to acquire a proper pressing force against the sideward-facing cam surface 22.

In other words, as for the reaction force Rc from the sideward-facing cam surface 22, when the horizontal pressing force against the sideward-facing cam surface is large, it is possible to acquire the vertical direction component Rc1 having the same magnitude, i.e., upwardly-directed vertical direction assist force for the spring force Fs even when the inclination of the sideward-facing cam surface with respect to the vertical direction is small. When the inclination of the sideward-facing cam surface with respect to the vertical direction is reduced, a curve of the laterally convex shape of the sideward-facing cam surface 22 can be made gentler accordingly.

Conversely, when the horizontal pressing force against the sideward-facing cam surface 22 is reduced by increasing the inclination of the downward-facing cam surface 15 and/or upward-facing cam surface 18 with respect to the vertical direction or by omitting one of the downward-facing cam surface 15 and upward-facing cam surface 18, the reaction force Rc from the sideward-facing cam surface 22 is reduced accordingly. In order to acquire the upwardly-directed vertical direction component Rc1 having the same magnitude, it is necessary to increase the inclination of the sideward-facing cam surface 22 with respect to the vertical direction, and, accordingly, the curve of the laterally convex shape of the sideward-facing cam surface 22 becomes steep.

Figure 6:
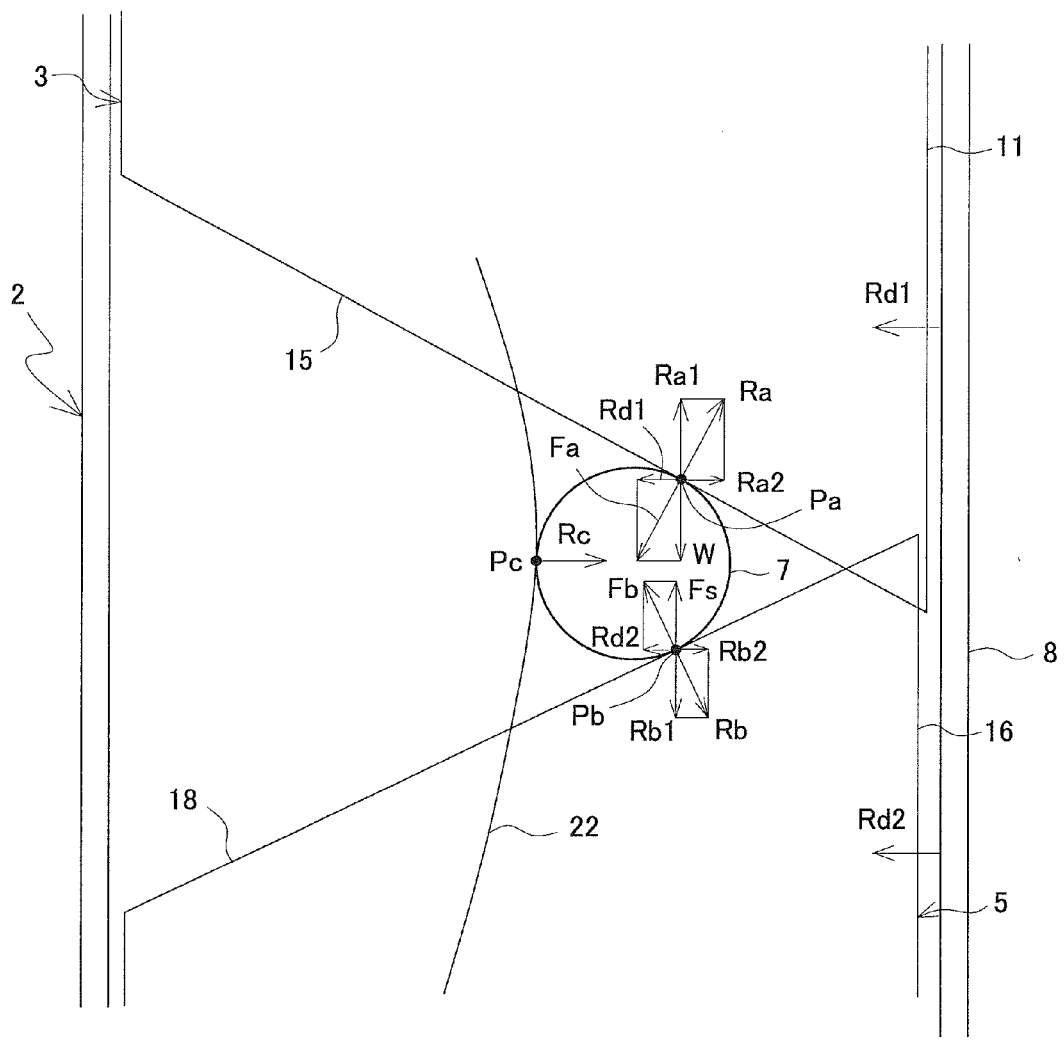
FIG. 6 is a schematic view for explaining the main components in a case where the mounting plate is situated at an intermediate position in the standard mode.

When the mounting plate 12 on which the article A with the load W is pushed down from the uppermost position of FIG. 3 to an intermediate position in the standard mode, the cam follower member 7 is situated within the second region S2 of the sideward-facing cam surface 22, as indicated by an imaginary line of FIG. 3. FIG. 6 schematically illustrates an equilibrium state between forces applied, at the intermediate position, to a system including the cam follower member 7, fixed column 8, movable column 11, spring force transmission member 5, and cam plates 19. As in the case of FIG. 5, loads of the supporting member 3 and spring force transmission member 5 and a friction force among the movable column 11, fixed column 8, and spring force transmission member are omitted here for simplification.

As in the case of FIG. 5, at the contact point Pa between the cam follower member 7 and downward-facing cam surface 15, the load W of the article A, reaction force Ra applied from the cam follower member 7 to the normal direction of the downward-facing cam surface 15, and horizontal reaction force Rd1 applied from the fixed column to movable column 11 are in equilibrium. The vertical direction component Ra1 of the reaction force Ra is equal in magnitude to the load W, and the horizontal direction component Ra2 of the reaction force Ra is equal in magnitude to the reaction force Rd1 from the fixed column 8. A force Fa with which the downward-facing cam surface 15 presses the cam follower member 7 is a resultant force of the load W and reaction force Rd1.

At the contact point Pb between the cam follower member 7 and upward-facing cam surface 18, the spring force Fs of the spring member 4, reaction force Rb applied from the cam follower member 7 to the normal direction of the upward-facing cam surface 18, and reaction force Rd2 horizontally applied from the fixed column 8 to spring force transmission member 5 through the movable column 11 are in equilibrium. The vertical direction component Rb1 of the reaction force Rb is equal in magnitude to the spring force Fs, and horizontal direction component Rb2 of the reaction force Rb is equal in magnitude to the reaction force Rd2 of the fixed column 8. A force Fb with which the upward-facing cam surface 18 presses the cam follower member 7 is a resultant force of the spring force Fs and reaction force Rd2.

At the contact point Pc between the cam follower member 7 and sideward-facing cam surface 22, forces Fa and Fb applied from the respective downward-facing cam surface and upward-facing cam surface 18 to the cam follower member 7 and reaction force Rc applied in the normal direction from the sideward-facing cam surface 22 are in equilibrium. Since the cam follower member 7 is situated in the second region S2 of the sideward-facing cam surface 22, the reaction force Rc has substantially only a horizontal component and does not have a vertical component. A magnitude of the reaction force Rc is a sum of the reaction forces Rd1 and Rd2 that the respective movable column 11 and spring force transmission member 5 receive from the fixed column 8.

As described above, when the cam follower member 7 is situated within the second region S2 of the sideward-facing cam surface 22, the spring force Fs of the spring member 4 and load W are substantially in equilibrium in the vertical direction. Thus, the spring force Fs does not require the assist force by the reaction force Rc from the sideward-facing cam surface 22. Also in this state, when the article A or the mounting plate 12 is pushed down or pushed up by a hand, the pushing-down or pushing-up force is added to the load W or spring force Fs to break the equilibrium state, so that the article can easily be lifted/lowered with a comparatively small force.

Figure 7:
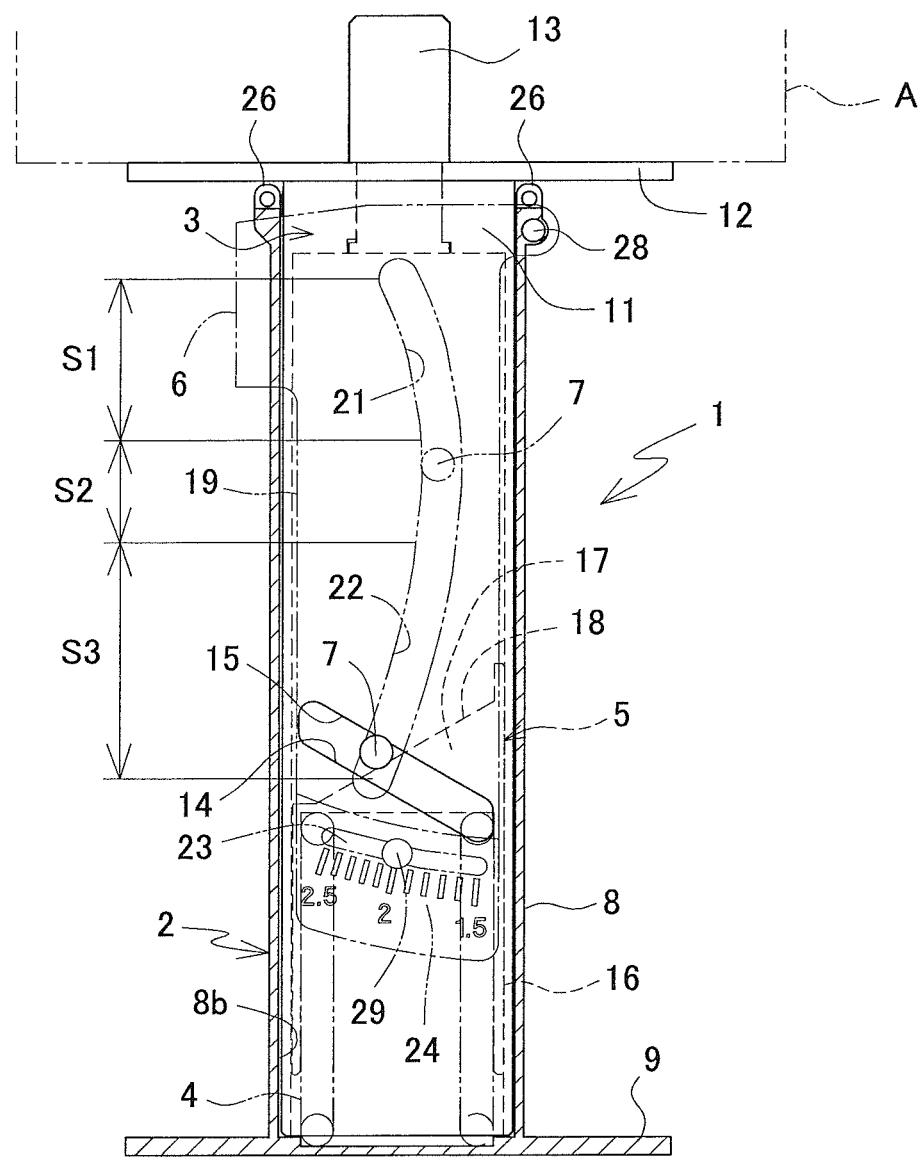
FIG. 7 is a vertical cross-sectional view of the present embodiment in which the mounting plate is situated at a lowermost position in the standard mode.

FIG. 7 illustrates a case where the mounting plate 12 on which the article A with the load W is pressed down to a lowest position in the standard mode. The cam follower member 7 is stopped at a lower limit position of the third region S3 of the sideward-facing cam surface 22.

Figure 8:
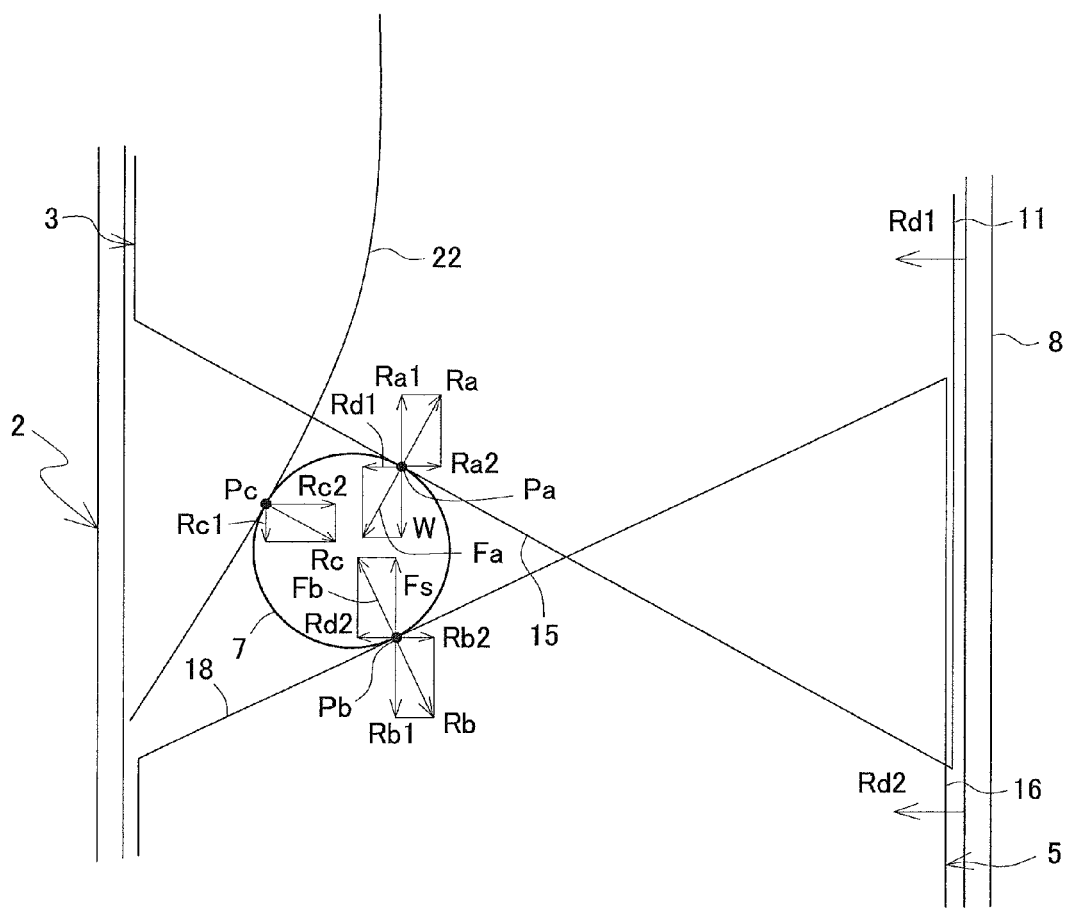
FIG. 8 is a schematic view for explaining a relationship among the main components in the state illustrated in FIG. 7.

FIG. 8 schematically illustrates an equilibrium state between forces applied, at the lower limit position, to a system including the cam follower member 7, fixed column 8, movable column 11, spring force transmission member 5, and cam plates 19. As in the case of FIGS. 5 and 6, loads of the supporting member 3 and spring force transmission member 5 and a friction force among the movable column 11, fixed column 8, and spring force transmission member are omitted here for simplification.

In FIG. 8, at the contact point Pa between the cam follower member 7 and downward-facing cam surface 15, the load W of the article A, reaction force Ra applied from the cam follower member 7 to the normal direction of the downward-facing cam surface 15, and horizontal reaction force Rd1 applied from the fixed column 8 to movable column are in equilibrium. The vertical direction component Ra1 of the reaction force Ra is equal in magnitude to the load W, and the horizontal direction component Ra2 of the reaction force Ra is equal in magnitude to the reaction force Rd1 from the fixed column 8. A force Fa with which the downward-facing cam surface 15 presses the cam follower member 7 is a resultant force of the load W and reaction force Rd1.

At the contact point Pb between the cam follower member 7 and upward-facing cam surface 18, the spring force Fs of the spring member 4, reaction force Rb applied from the cam follower member 7 to the normal direction of the upward-facing cam surface 18, and reaction force Rd2 horizontally applied from the fixed column 8 to spring force transmission member 5 through the movable column 11 are in equilibrium. The vertical direction component Rb1 of the reaction force Rb is equal in magnitude to the spring force Fs, and horizontal direction component Rb2 of the reaction force Rb is equal in magnitude to the reaction force Rd2 of the fixed column 8. A force Fb with which the upward-facing cam surface 18 presses the cam follower member 7 is a resultant force of the spring force Fs and reaction force Rd2.

At the contact point Pc between the cam follower member 7 and sideward-facing cam surface 22, forces Fa and Fb applied from the respective downward-facing cam surface and upward-facing cam surface 18 to the cam follower member 7 and reaction force Rc applied in the normal direction from the sideward-facing cam surface 22 are in equilibrium. Since the cam follower member 7 is situated in the third region S3 of the sideward-facing cam surface 22, the reaction force Rc has the vertical direction component Rc1 directed downward. A magnitude of the horizontal direction component Rc2 of the reaction force Rc is a sum of the reaction forces Rd1 and Rd2 that the respective movable column 11 and spring force transmission member 5 receive from the fixed column 8.

In the case of FIG. 7, a displacement amount of the spring member 4 is maximum. Accordingly, the spring force Fs is maximum, which is larger in magnitude than the load W. Thus, the vertical direction component Rc1 of the reaction force Rc applied downward from the sideward-facing cam surface 22 acts in a direction that reduces an upward biasing force, i.e., pushing-up force by the spring force Fs, whereby the equilibrium state between the spring force Fs and load W in the vertical direction is achieved.

Also in this state, when the article A or the mounting plate 12 is pushed up by a hand, the pushing-up force is added to the spring force Fs to break the equilibrium state, so that the article can easily be lifted with a comparatively small force. When the mounting plate 12 is lifted, the cam follower member 7 is moved up while being displaced laterally along the sideward-facing cam surface 22, downward-facing cam surface 15, and upward-facing cam surface 18. While the cam follower member 7 is situated within the third region S3 of the sideward-facing cam surface 22, the downwardly-directed vertical direction component Rc1 of the reaction force Rc acts in a direction that reduces the pushing-up force by the spring force Fs of the spring member 4 to bring the spring force Fs into an equilibrium state with the load W.

The spring force Fs of the spring member 4 is reduced as a displacement amount of the compression spring is reduced as a result of upward movement of the spring force transmission member 5 against the pressing force of the cam follower member 7. With the reduction in the spring force Fs, the vertical direction component Rc1 of the reaction force Rc from the cam plates 19 can be reduced in magnitude. Thus, the inclination of the tangential direction of the sideward-facing cam surface 22 with respect to the vertical direction is reduced toward the upper side of the sideward-facing cam surface 22.

Also in the third region S3, the larger a force with which the cam follower member 7 that receives a pressing force from the downward-facing cam surface 15 and upward-facing cam surface 18 presses the sideward-facing cam surface 22 in the horizontal direction, the larger the horizontal direction component Rc2 of the reaction force Rc becomes, and thus, the larger the reaction force Rc and vertical direction component Rc1 thereof. Similarly, the reaction force Rd1 and reaction force Rd2 are increased when the inclinations of the downward-facing cam surface 15 and upward-facing cam surface 18 with respect to the vertical direction are reduced, respectively, while the forces Rd1 and Rd2 are reduced when the inclinations of the downward-facing cam surface 15 and upward-facing cam surface 18 with respect to the vertical direction are increased, respectively. By adjusting the inclinations of the downward-facing cam surface 15 and upward-facing cam surface 18 with respect to the vertical direction, it is possible to acquire an adequate pressing force against the sideward-facing cam surface 22.

In other words, as for the reaction force Rc from the sideward-facing cam surface 22, when the horizontal pressing force against the sideward-facing cam surface is large, it is possible to acquire the vertical direction component Rc1 having the same magnitude, i.e., a downwardly-directed vertical direction force that reduces the pushing-up force even when the inclination of the sideward-facing cam surface with respect to the vertical direction is small. When the inclination of the sideward-facing cam surface with respect to the vertical direction is reduced, a curve of the laterally convex shape of the sideward-facing cam surface 22 can be made gentler accordingly.

Conversely, when the horizontal pressing force against the sideward-facing cam surface 22 is reduced by increasing the inclination of the downward-facing cam surface 15 and/or upward-facing cam surface 18 with respect to the vertical direction or by omitting one of the downward-facing cam surface 15 and upward-facing cam surface 18, the reaction force Rc from the sideward-facing cam surface 22 is reduced accordingly. In order to acquire the upward vertical direction component Rc1 having the same magnitude, it is necessary to increase the inclination of the sideward-facing cam surface 22 with respect to the vertical direction, and, accordingly, the curve of the laterally convex shape of the sideward-facing cam surface 22 becomes steep.

As for the entire shape of the sideward-facing cam surface 22, by setting a force with which the cam follower member 7 presses the sideward-facing cam surface 22 in the horizontal direction to an adequate magnitude by the downward-facing cam surface 15 and upward-facing cam surface 18 inclined with respect to the vertical direction, it is possible to make a curve of the laterally convex shape of the sideward-facing cam surface 22 gentler throughout the first to third regions S1 to S3. This can make the dimensions of the second cam groove 21 and cam plates 19 in the horizontal direction comparatively small, thereby achieving miniaturization of the article supporting device 1 itself. Further, as illustrated in FIG. 1, even when the cam member 6 is pivoted about the pivot pin 28, lateral protrusion of the cam member 6 from the fixed column 8 can be advantageously reduced.

According to the present embodiment, over the entire region of the sideward-facing cam surface 22, the load W of the article A, spring force Fs of the spring member 4, reaction force from the fixed column 8, and reaction force from the cam plates 19 applied to the system including the cam follower member 7, fixed column 8, movable column 11, spring force transmission member 5, and cam plates 19 are in equilibrium around the cam follower member 7. Thus, in the range of the vertical stroke of the mounting plate 12, it is possible to stop the mounting plate 12 on which the article A is placed at a desired height position and hold the same at that position and further to lift/lower the mounting plate 12 with a comparatively small force.

Actually, upon lifting/lowering of the mounting plate 12, resistance such as a friction that is ignored in the above description occurs among the movable column 11, fixed column 8, and spring force transmission member 5. In the present embodiment, the resistance due to the friction between the movable column 11 and fixed column 8 is reduced by the guide rollers 26 provided at the upper end of the fixed column 8 and guide rollers 27 provided at corner portions of the lower end of the movable column 11, thereby eliminating or alleviating influence on the lifting/lowering operation of the mounting plate 12, which allows smooth operation to be ensured.

Figure 9:
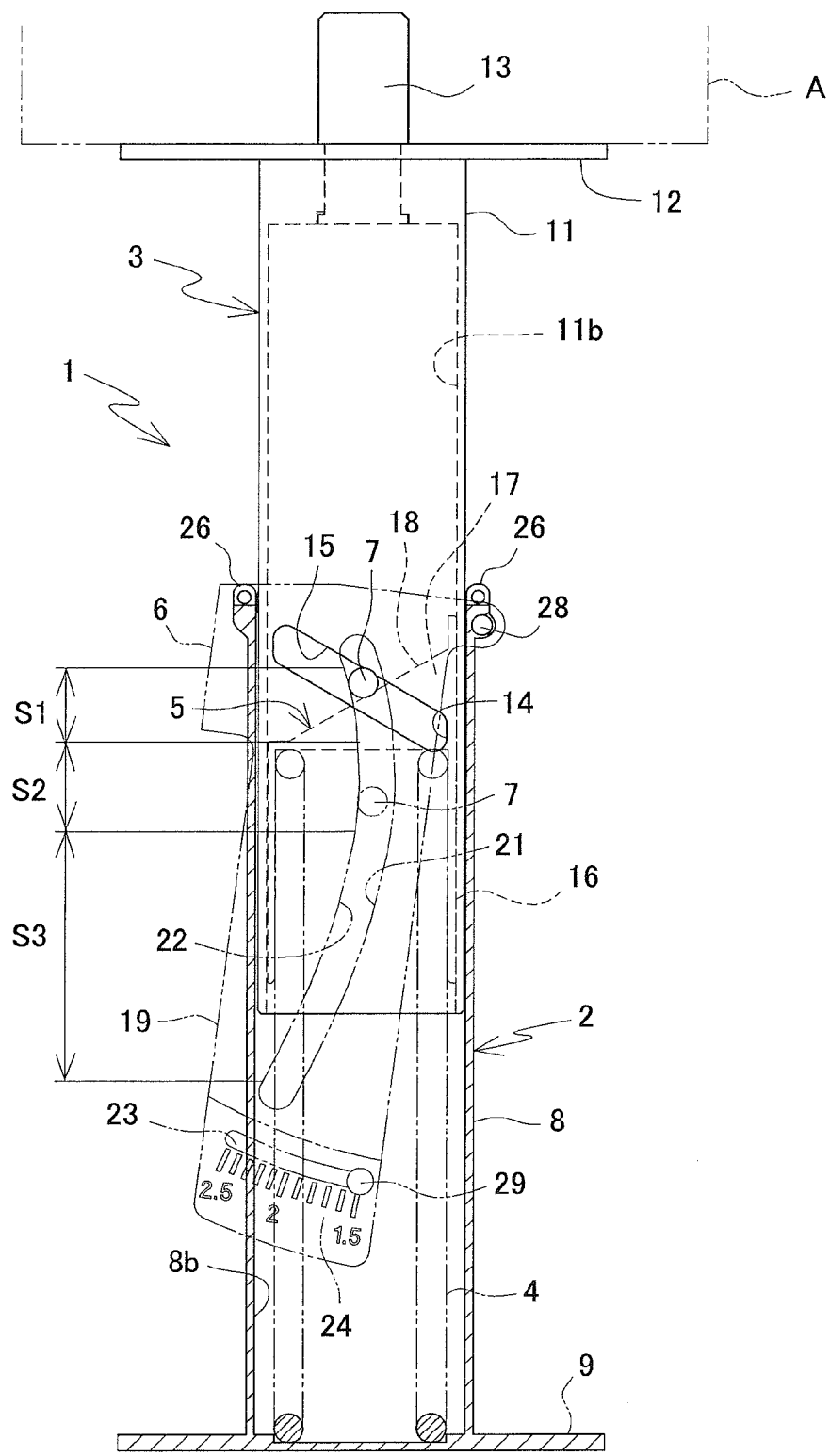
FIG. 9 is a vertical cross-sectional view of the present embodiment in which the mounting plate is situated at the uppermost position in a lightweight mode.
Figure 10:
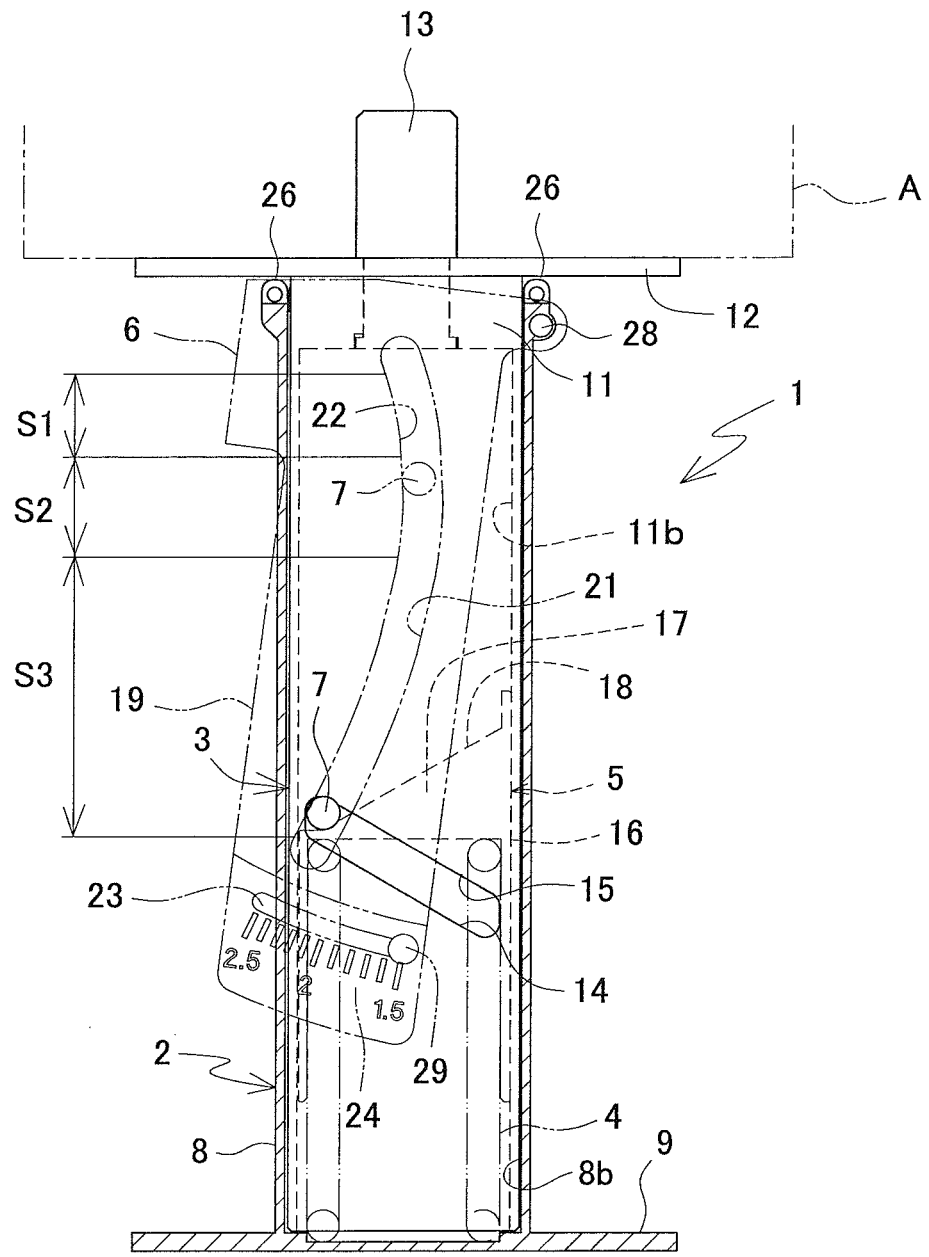
FIG. 10 is a vertical cross-sectional view of the present embodiment in which the mounting plate is situated at the lowermost position in the lightweight mode.

FIGS. 9 and 10 illustrate the article supporting device 1 set in the lightweight mode. The lightweight mode is set by rotating the cam plates 19 in a clockwise direction in the figure about the pivot pins 28 to position the positioning screw 29 to "1.5" of the scale 24 and fastening the positioning screw 29. As in the case of the standard mode illustrated in FIG. 3, the sideward-facing cam surface 22 is divided into three regions: the first region S1 in which the normal direction at the contact point with the cam follower member 7 is directed upward with respect to the horizontal direction, second region S2 in which the tangential direction at the contact point with the cam follower member 7 is directed substantially vertically, and third region S3 in which the normal direction at the contact point with the cam follower member is directed downward with respect to the horizontal direction.

FIG. 9 illustrates a case where the mounting plate 12 on which the article A is placed is situated at the uppermost position. The cam follower member 7 is stopped at the upper limit position of the first region S1 of the sideward-facing cam surface 22. In this state, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode using FIG. 5, in the first region S1, the displacement amount of the spring member 4 is small, and the spring force Fs of the spring member 4 is smaller in magnitude than the load W. The reaction force Rc applied from the sideward-facing cam surface 22 to the cam follower member 7 includes a vertical direction component directed upward. By adding the upwardly-directed vertical direction component of the reaction force Rc to the spring force Fs as an assist force, an equilibrium state between the spring force Fs and load W in the vertical direction is achieved.

When the mounting plate 12 on which the article A is placed is pushed down by a hand from the uppermost position to the intermediate position of FIG. 9, the cam follower member 7 is situated within the second region S2 of the sideward-facing cam surface 22, as indicated by an imaginary line of FIG. 9. Also at the intermediated position, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode using FIG. 6, in the second region S2, the reaction force Rc from the sideward-facing cam surface 22 has substantially only a horizontal component and does not have a vertical component. The spring force Fs of the spring member 4 and load W are substantially in equilibrium in the vertical direction.

FIG. 10 illustrates a case where the mounting plate 12 on which the article A is placed is situated at the lowermost position. The cam follower member 7 is stopped at the lower limit position of the third region S3 of the sideward-facing cam surface 22. Also in this state, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode using FIG. 8, in the third region S3, the displacement amount of the spring member 4 is large, and the spring force Fs of the spring member 4 is larger in magnitude than the load W. The reaction force Rc applied from the sideward-facing cam surface 22 to the cam follower member 7 includes a vertical direction component directed downward. The downwardly-directed vertical direction component of the reaction force Rc acts in a direction that reduces the pushing-up force by the spring force Fs, whereby an equilibrium state between the spring force Fs and load W in the vertical direction is achieved.

Figure 11:
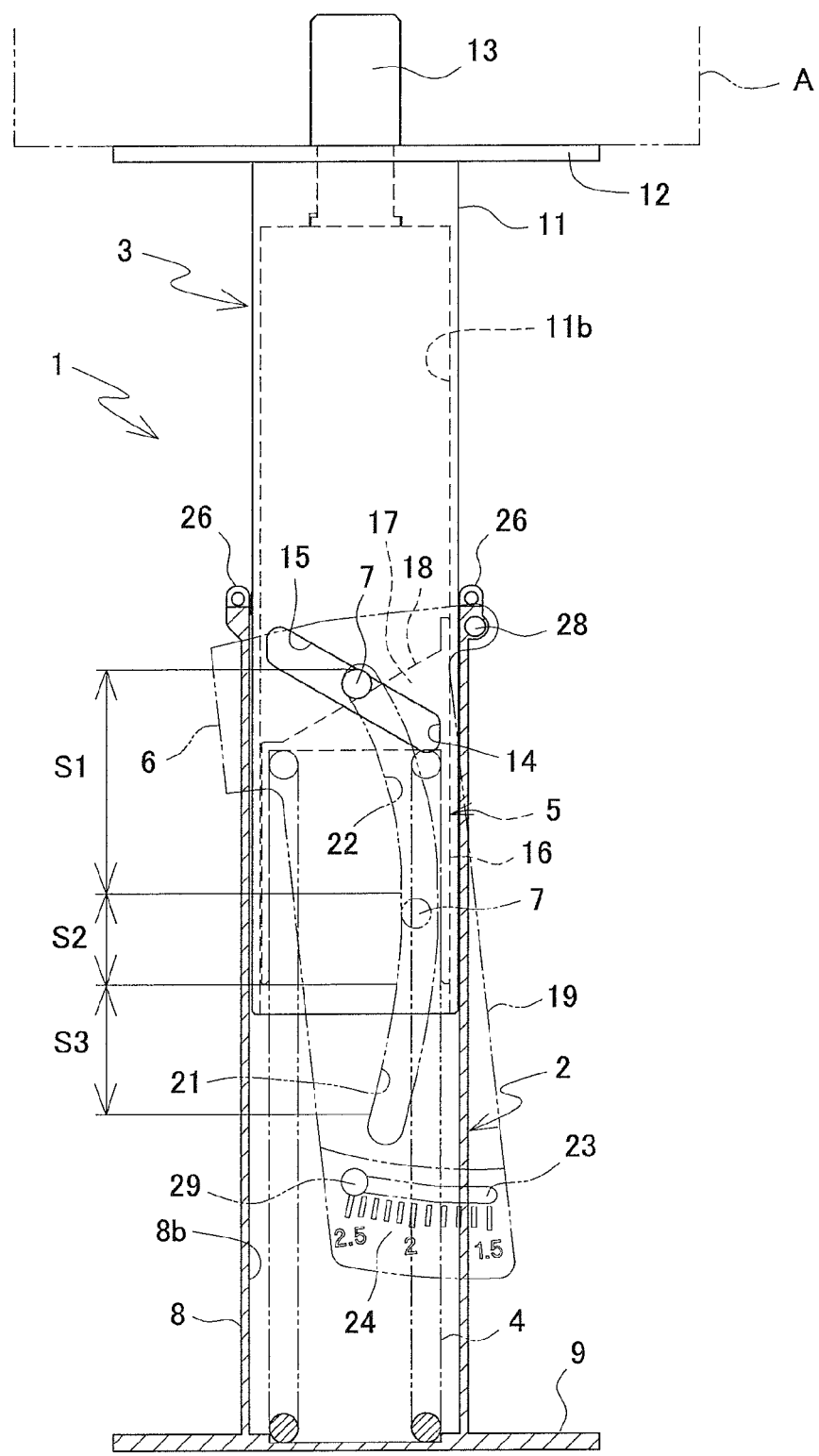
FIG. 11 is a vertical cross-sectional view of the present embodiment in which the mounting plate is situated at the uppermost position in a heavyweight mode.
Figure 12:
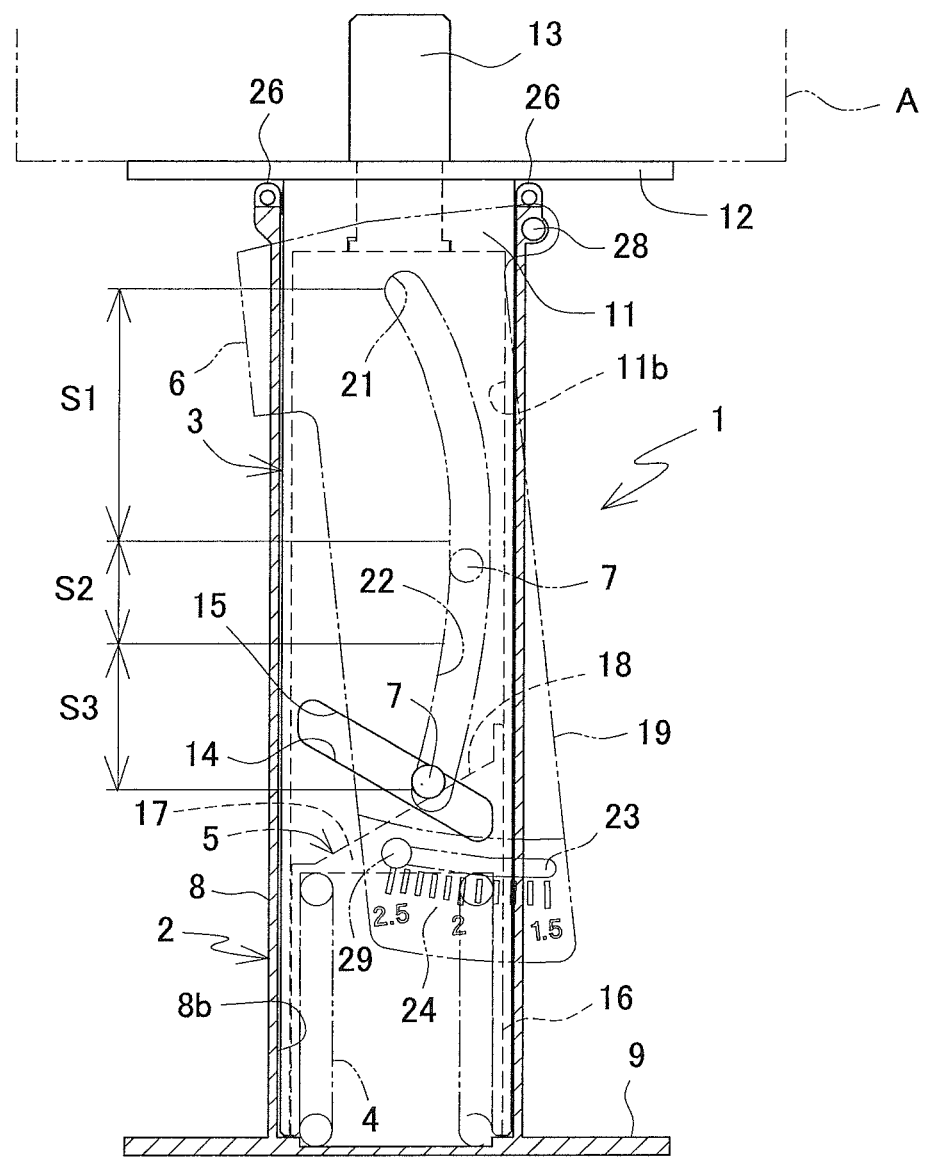
FIG. 12 is a vertical cross-sectional view of the present embodiment in which the mounting plate is situated at the lowermost position in the heavyweight mode.

FIGS. 11 and 12 illustrate the article supporting device 1 set in the heavyweight mode. The heavyweight mode is set by rotating the cam plates 19 in a counterclockwise direction in the figure about the pivot pins 28 to position the positioning screw 29 to "2.5" of the scale 24 and fastening the positioning screw 29. As in the case of the standard mode illustrated in FIG. 3, the sideward-facing cam surface 22 is divided into three regions: the first region S1 in which the normal direction at the contact point with the cam follower member 7 is directed upward with respect to the horizontal direction, second region S2 in which the tangential direction at the contact point with the cam follower member 7 is directed substantially vertically, and third region S3 in which the normal direction at the contact point with the cam follower member is directed downward with respect to the horizontal direction.

FIG. 11 illustrates a case where the mounting plate 12 on which the article A is placed is situated at the uppermost position. The cam follower member 7 is stopped at the upper limit position of the first region S1 of the sideward-facing cam surface 22. In this state, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode and lightweight mode, in the first region S1, the displacement amount of the spring member 4 is small, and the spring force Fs of the spring member 4 is smaller in magnitude than the load W. The reaction force Rc applied from the sideward-facing cam surface 22 to the cam follower member 7 includes a vertical direction component directed upward. By adding the upwardly-directed vertical direction component of the reaction force Rc to the spring force Fs as an assist force, an equilibrium state between the spring force Fs and load W in the vertical direction is achieved.

When the mounting plate 12 on which the article A is placed is pushed down by a hand from the uppermost position to the intermediate position of FIG. 11, the cam follower member 7 is situated within the second region S2 of the sideward-facing cam surface 22, as indicated by an imaginary line of FIG. 11. Also at the intermediated position, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode and lightweight mode, in the second region S2, the reaction force Rc from the sideward-facing cam surface 22 has substantially only a horizontal component and does not have a vertical component. The spring force Fs of the spring member 4 and load W are substantially in equilibrium in the vertical direction.

FIG. 12 illustrates a case where the mounting plate 12 on which the article A is placed is situated at the lowermost position. The cam follower member 7 is stopped at the lower limit position of the third region S3 of the sideward-facing cam surface 22. In this state, the load W of the article A, spring force Fs of the spring member 4, reaction force from the fixed column 8, and reaction force from the cam plates 19 are applied to the system including the cam follower member 7, fixed column 8, movable column 11, spring force transmission member 5, and cam plates 19 and are in equilibrium around the cam follower member 7.

As described above regarding the standard mode and lightweight, in the third region S3, the displacement amount of the spring member 4 is large, and the spring force Fs of the spring member 4 is larger in magnitude than the load W. The reaction force Rc applied from the sideward-facing cam surface 22 to the cam follower member 7 includes a vertical direction component directed downward. The downwardly-directed vertical direction component of the reaction force Rc acts in a direction that reduces the pushing-up force by the spring force Fs, whereby an equilibrium state between the spring force Fs and load W in the vertical direction is achieved.

When FIGS. 9 and 10 and FIGS. 3 and 7 are compared with each other, respectively, it can be seen that the first to third regions S1 to S3 are located at an upper position as a whole in the lightweight mode than in the standard mode. Thus, the first region S1 is narrower while the third region S3 is wider than in the standard mode.

When FIGS. 11 and 12 and FIGS. 3 and 7 are compared with each other, respectively, it can be seen that the first to third regions S1 to S3 are located at a lower position as a whole in the heavyweight mode than in the standard mode. Thus, the first region S1 is wider while the third region S3 is narrower than in the standard mode.

In the lightweight mode, the same spring member 4 as in the standard mode is used even though the load W of the article A is smaller than in the standard mode, so that a force that pushes up the article A becomes relatively larger. Thus, the assist force required for the spring force Fs to achieve an equilibrium state with the load W in the vertical direction in an upper region of the sideward-facing cam surface 22 in which a displacement amount of the spring member 4 is small may be smaller than in the standard mode. In addition, it is possible to achieve an equilibrium state between the spring force Fs and load W in the vertical direction without the assist force at an upper position than in the standard mode. Conversely, at a lower region of the sideward-facing cam surface 22 in which the displacement amount of the spring member 4 is large, it is necessary to make a downward force from an upper position than in the standard mode in order to reduce the pushing-up force.

On the other hand, in the heavyweight mode, the same spring member 4 as in the standard mode is used even though the load W of the article A is larger than in the standard mode, so that a force that pushes up the article A becomes relatively smaller. Thus, the assist force required for the spring force Fs to achieve an equilibrium state with the load W in the vertical direction in the upper region of the sideward-facing cam surface 22 in which a displacement amount of the spring member 4 is small is larger than in the standard mode. In addition, it is possible to achieve an equilibrium state between the spring force Fs and load W in the vertical direction without the assist force at a lower position than in the standard mode. At the lower region in which the displacement amount of the spring member 4 is large, a force that reduces the pushing-up force may be smaller than in the standard mode.

As described above, in the present embodiment, the cam plates 19 are rotated to change the direction of the entire sideward-facing cam surface 22 with respect to the cam follower member 7, thereby allowing the first to third regions to be shifted upward or downward, corresponding to the lightweight mode or heavyweight mode, as illustrated in FIG. 9 or FIG. 11, without need of replacement of the cam plates, i.e., cam member 6. In addition, the cam profile of the sideward-facing cam surface 22 is designed so as to allow the mounting plate 12 on which the article is placed to be stopped at a desired height position over the entire region of the sideward-facing cam surface 22 even when the first to third regions S1 to S3 are shifted.

The above description has been made of a case where the load W of the article is 1.5 kg, 2 kg, or 2.5 kg; however, naturally the present embodiment can also be applied to a load range of the article that can be placed on the article supporting device 1. When the cam plates 19 are fixed to a predetermined position in accordance with the load to be supported, the sideward-facing cam surface is designed to a cam profile that allows the mounting plate 12 on which the article is placed to be stopped at a desired height position over the entire region of the sideward-facing cam surface 22.

Further, in an alternative embodiment, one of the downward-facing cam surface 15 of the movable column 11 and upward-facing cam surface 18 of the spring force transmission member 5 can be omitted. In this case, a part of the movable column 11 or spring force transmission member 5 whose cam surface is omitted against which the cam follower member abuts only needs to receive a force in the direction of the load W or spring force Fs, i.e., a force in the vertical direction and thus can be formed by a flat surface having a given length in the horizontal direction so as to allow the cam follower member 7 to be freely displaced in the horizontal direction. Further, one of the downward-facing cam surface 15 and upward-facing cam surface 18 that is not omitted is increased in inclination with respect to the vertical direction thereof as compared to that in the present embodiment, thereby allowing the same pressing force as that in the present embodiment to be applied to the sideward-facing cam surface 22.

According to the first embodiment, in the equilibrium state between the load of the article to be supported and pushing-up force of the spring, the article can be pushed up or down from the stationary position with a comparatively small force. However, when the article is heavy, an inertial force acting during movement thereof is correspondingly increased, so that a large force may be required to stop the article, or it may be difficult to stop the article at a desired position. Thus, in a second embodiment, a motive power is provided to lift/lower the supporting member 3 with respect to the base member 2. In the following second embodiment, a configuration provided with a driver 31 will be described. In the first embodiment, the article A or mounting plate 12 is pushed up/down by a user's hand, while in the second embodiment, the mounting plate 12 is lifted/lowered by a drive force of the driver 31. Thus, the mechanism for producing the equilibrium state and mechanism for adjusting the cam position in accordance with the load are the same as those in the first embodiment, so that the same reference numerals are given to the same components as in the first embodiment and descriptions thereof will be omitted.

Figure 13:
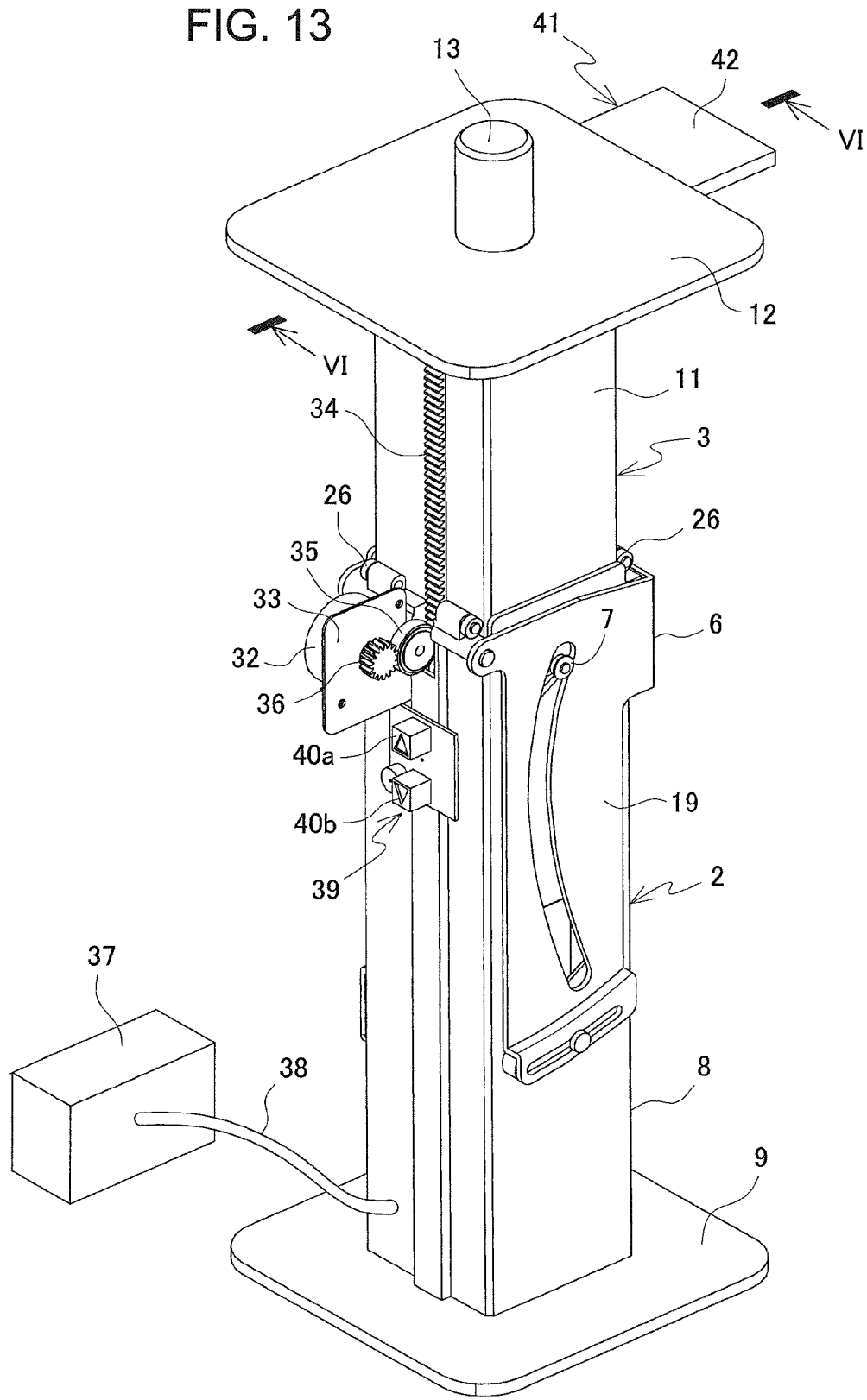
FIG. 13 is a perspective view of the article supporting mechanism according to a second embodiment as viewed in a direction opposite to that of FIG. 1.

The article supporting device 1 according to the second embodiment is provided with a driver 31 for lifting/lowering the supporting member 3 with respect to the base member 2. The driver 31 includes a drive motor 32 and a drive force transmission mechanism for transmitting a drive force of the drive motor 32 to the movable column 11 of the supporting member 3. As illustrated in FIG. 13, the drive motor 32 is mounted to an upper portion of a side surface of the fixed column 8 on an opposite side to the connecting plate 20 of the cam member 6 using a mounting stay 33.

Figure 14:
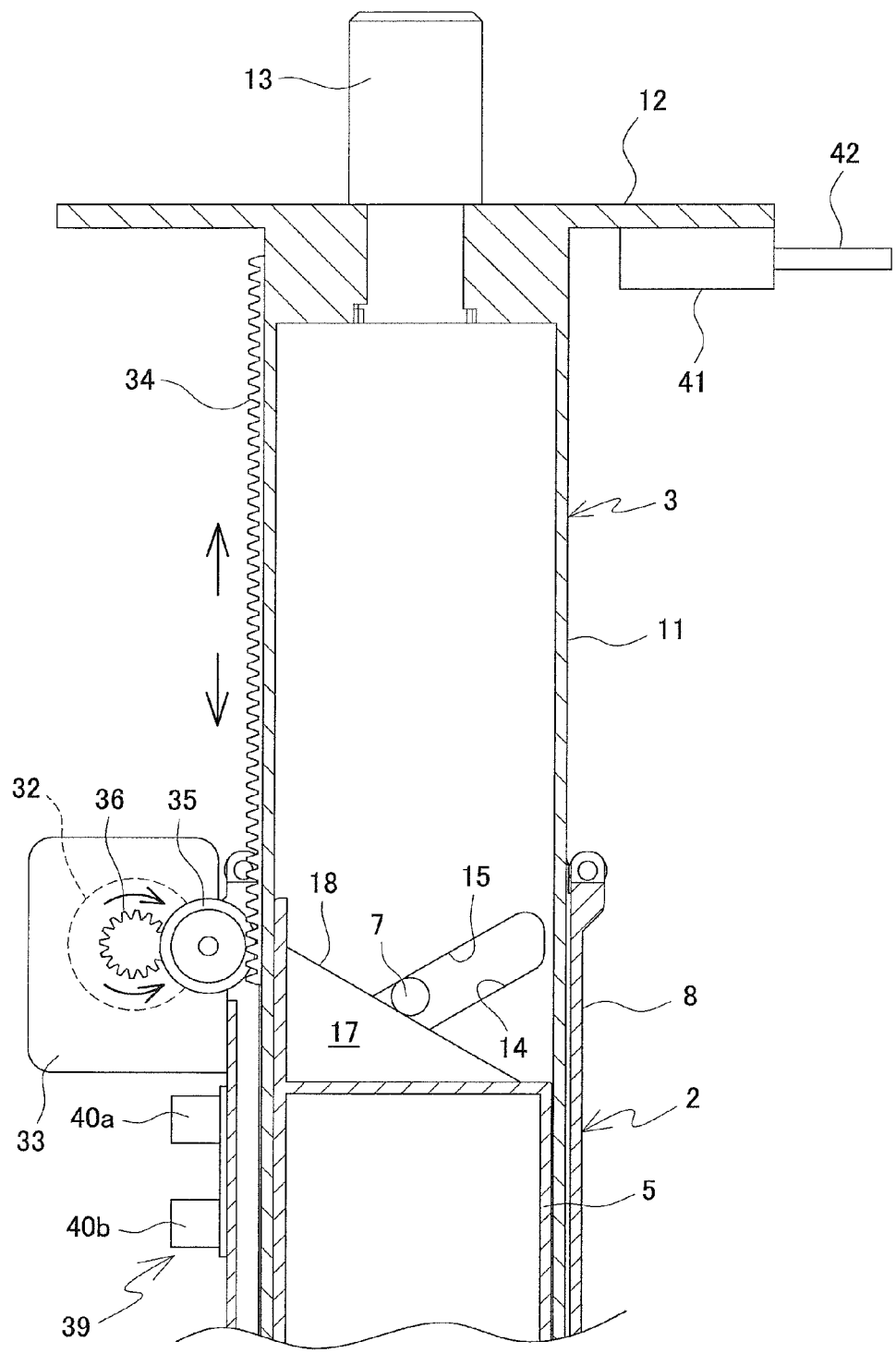
FIG. 14 is a cross-sectional view of the article supporting mechanism according to the second embodiment taken along a line VI-VI of FIG. 4.

The drive force transmission mechanism includes a rack 34 provided integrally with and along one side surface of the movable column 11 and a pinion 35 meshed with the rack and pivotably supported by the mounting stay 33. The rack vertically extends from near the upper end of the movable column 11 up to a position at which it is meshed with the pinion 35 when the mounting plate 12 is situated at the uppermost position as illustrated in FIG. 14. The pinion 35 is meshed with a drive gear 36 fitted at a leading end of a rotary shaft of the drive motor 32. The drive motor 32 is connected to an external power source 37 by a power cable 38. In an alternative embodiment, an internal battery may be used in place of the power source 37.

A first ascent/descent switch 39 for ON/OFF control of the drive motor 32 is provided at the surface of the movable column 11. The first ascent/descent switch 39 includes a lifting button 40a and a lowering button 40b. Further, a second ascent/descent switch 41 is provided on a lower side of the mounting plate 12. The second ascent/descent switch 41 has one switch lever 42 extending horizontally from a switch box thereof, at a leading end of which the lifting/lowering can be performed.

In the present embodiment, by turning ON the drive motor 32 to drive downward the movable column 11, the mounting plate 12 on which the article A is placed can be lowered. The drive motor 32 can be ON/OFF controlled from either one of the first and second ascent/descent switches 39 and 41.

The first ascent/descent switch 39 may be, e.g., a pressure sensitive switch energized only while the lifting button 40a or lowering button 40b is pressed and capable of continuously changing a resistance value of a contact point by a pressing force thereagainst. In this case, the drive motor 32 is in an ON state while the lowering button is pressed, to be rotated in a counterclockwise direction indicated by an arrow in FIG. 14, whereby the mounting plate 12 is lowered. When the lowering button is released, the drive motor is turned OFF, with the result that the mounting plate can be stopped at that position. Further, when the lowering button 40b is pressed hard, a rotating speed of the drive motor is increased, with the result that the mounting plate 12 is lowered quickly. Conversely, when the lowering button is pressed lightly, a rotating speed of the drive motor is low, with the result that the mounting plate 12 is lowered slowly.

The second ascent/descent switch 41 may be, e.g., a type that utilizes a strain gauge or a resistance sheet to detect the lifting/lowering direction of the switch lever and a strain amount and controls the drive motor 32 based on the detected direction and strain amount. The drive motor 32 is in an ON state while the switch lever 42 is pushed down, to be rotated in the counterclockwise direction indicated by the arrow in FIG. 14, whereby the mounting plate 12 is lowered. When the switch lever is released to move the lever back to its original horizontal position, the drive motor is turned OFF, with the result that the mounting plate can be stopped at that position. Further, when the switch lever 42 is pushed down hard, a rotating speed of the drive motor is increased, with the result that the mounting plate 12 is lowered quickly. Conversely, when the switch lever is pushed down lightly, a rotating speed of the drive motor is low, with the result that the mounting plate 12 is lowered slowly.

As the thus configured first and second ascent/descent switches 39 and 41, widely commercially available switches can be used. Further, the ascent/descent switches may be those that simply turn ON/OFF the drive motor and need not be able to control the rotating speed of the drive motor. Further, a lock function may be provided for the ascent/descent switches for prevention of misoperation.

As described above, the mounting plate 12 on which the article A is placed can be moved with a comparatively small force, and accordingly, an output of the drive motor 32 may be comparatively small. Thus, miniaturization of the article supporting device 1 can be easily achieved.

The drive motor 32 may be provided with an electromagnetic brake. In this case, even if an external force is applied to the article A or mounting plate 12, the motor is not rotated easily, so that it is possible to retain the mounting plate 12 at a desired height position more safely. When the drive motor 32 does not have such a brake function, the mounting plate 12 may be pushed down by a user's hand.

In the present embodiment, it is only necessary to turn ON the drive motor 32 to drive upward the movable column 11 in order to lift the mounting plate 12 on which the article A is placed. The drive motor 32 can be ON/OFF controlled from either one of the first and second ascent/descent switches 39 and 41.

While the lifting button 40a of the first ascent/descent switch 39 is pressed, the drive motor 32 is in an ON state to be rotated in a clockwise direction in FIG. 14, whereby the mounting plate 12 is lifted. When the lifting button is released, the drive motor is turned OFF, with the result that the mounting plate can be stopped at that position. Further, when the lifting button 40a is pressed hard, a rotating speed of the drive motor is increased, with the result that the mounting plate 12 is lifted quickly. Conversely, when the lifting button is pressed lightly, a rotating speed of the drive motor is low, with the result that the mounting plate 12 is lifted slowly.

While the switch lever 42 of the second ascent/descent switch 41 is pushed up, the drive motor 32 is in an ON state to be rotated in the clockwise direction in FIG. 14, whereby the mounting plate 12 is lifted. When the switch lever is released to move the lever back to its original horizontal position, the drive motor is turned OFF, with the result that the mounting plate can be stopped at that position. Further, when the switch lever 42 is pushed up hard, a rotating speed of the drive motor is increased, with the result that the mounting plate 12 is lifted quickly. Conversely, when the switch lever is pushed up lightly, a rotating speed of the drive motor is low, with the result that the mounting plate 12 is lifted slowly.

Thus, in the second embodiment, the article supporting device 1 is provided with the driver 31, so that only by turning ON the drive motor 32 to apply a comparatively small drive force, the force is added to the load W or spring force Fs to break the equilibrium state. Thus, the article A or mounting plate 12 can easily be lifted/lowered.

Although the preferred embodiments of the present invention have been described, it should be understood that the present invention is not limited to the above embodiments. Thus, various modifications and changes may be made within the technical scope of the present invention. For example, the downward-facing cam surface of the movable column and sideward-facing cam surface of each of the cam plates may be achieved by various known configurations in addition to the above-described inner peripheral edge of the cam groove. Further, the load range of the article that can be placed on the article supporting device 1 can be set variously, and accordingly, the downward-facing cam surface of the movable column, upward-facing cam surface of the spring force transmission member, and sideward-facing cam surface of each of the cam plates can be designed to various cam profiles. As the driver, various known drive means can be used in addition to the electric motor. Further, as the spring member, various known springs, such as springs having different shapes (plate spring, spiral spring, etc.), a fluid spring (air spring, etc.), springs formed of an elastic member or other nonmetal materials can be used in addition to the above-described compression coil spring.

This application claims the Japanese Patent Application No. 2013-214256, Japanese Patent Application No. 2013-214253, and Japanese Patent Application No. 2013-214258, which are incorporated herein by reference in its entirety.

What is claimed is:

1. A load supporting device comprising:
a supporting member for supporting a load, capable of being moved within a predetermined range along a predetermined direction;
a spring member whose one end is fixed and another end applies a biasing force to the supporting member against the load in a direction along a moving direction of the supporting member;
a cam follower;
a first cam surface that abuts against the cam follower to transmit the load to a spring member side and that is inclined with respect to the biasing force direction;
a second cam surface that abuts against the cam follower to transmit the biasing force to a supporting member side and that is inclined with respect to the biasing force direction;
a third cam surface that abuts against the cam follower and is inclined with respect to the biasing force direction;
a first side supporting portion that generates, at the first cam surface, a reaction force against the load that restricts a displacement of the first cam surface in a direction perpendicular to the biasing force direction; and
a second side supporting portion that generates, at the second cam surface, a reaction force against a biasing force that restricts a displacement of the second cam surface in the direction perpendicular to the biasing force direction, wherein
a pressing force of the third cam surface against the cam follower includes a first direction component along a direction of the biasing force generated depending on a position in the predetermined range over which the supporting member can be moved and a second direction component perpendicular to at least the biasing force direction, and
the first cam surface, second cam surface, and third cam surface are designed such that in the predetermined range over which the supporting member can be moved, the load, biasing force of the spring member, pressing force of the third cam surface against the cam follower, a reaction force of the first side supporting portion against the first cam surface, and a reaction force of the second side supporting portion against the second cam surface are in equilibrium about the cam follower.

2. The load supporting device according to claim 1, wherein
in the predetermined range over which the supporting member can be moved, the third cam surface has a first region in which the first direction component of the pressing force of the third cam surface against the cam follower acts on the biasing force direction and a second region in which the first direction component of the pressing force of the third cam surface against the cam follower acts on a direction reverse to the biasing force direction.

3. The load supporting device according to claim 1, further comprising a fixed member that fixes thereto the one end of the spring member and that has the first and second side supporting portions.

4. The load supporting device according to claim 3, wherein
the supporting member is configured to be movable with respect to the fixed member, and
means for reducing a resistance generated upon movement of the supporting member is provided between the supporting member and fixed member.

5. The load supporting device according to claim 1, wherein
the first cam surface and second cam surface are inclined in reverse directions to each other and disposed opposite to each other with the cam follower interposed therebetween.

6. The load supporting device according to claim 1, wherein
the third cam surface is configured to be changeable in a direction with respect to the cam follower in accordance with a change in a magnitude of the load and is provided so as to be able to retain an equilibrium state among the forces applied about the cam follower after the change in the direction with respect to the cam follower.

7. The load supporting device according to claim 1, further comprising a drive mechanism that can perform control for moving the supporting member in the moving direction.

8. The load supporting device according to claim 7, wherein
the drive mechanism can control start and stop of the movement of the supporting member, and a direction or speed of the supporting member.

* * * * *